(12) United States Patent
Lim et al.

(10) Patent No.: US 9,419,974 B2
(45) Date of Patent: Aug. 16, 2016

(54) APPARATUS AND METHOD FOR PERFORMING USER AUTHENTICATION BY PROXY IN WIRELESS COMMUNICATION SYSTEM

(71) Applicants: Samsung Electronics Co. Ltd., Suwon-si, Gyeonggi-do (KR); UNIVERSITY-INDUSTRY COOPERATION GROUP OF KYUNG HEE UNIVERSITY, Yongin-si, Gyeonggi-do (KR)

(72) Inventors: Han-Na Lim, Seoul (KR); Sung-Won Lee, Yongin-si (KR); Ji-Cheol Lee, Suwon-si (KR)

(73) Assignees: Samsung Electronics Co., Ltd., Suwon-si (KR); University-Industry Cooperation Group of Kyung Hee University, Yongin-si (KR)

( * ) Notice: Subject to any disclaimer, the term of this patent is extended or adjusted under 35 U.S.C. 154(b) by 155 days.

(21) Appl. No.: 13/851,669

(22) Filed: Mar. 27, 2013

(65) Prior Publication Data

US 2013/0263239 A1    Oct. 3, 2013

(30) Foreign Application Priority Data

Mar. 27, 2012    (KR) .................. 10-2012-0030957

(51) Int. Cl.
*H04L 29/06*    (2006.01)
*H04W 12/06*    (2009.01)

(52) U.S. Cl.
CPC ........... *H04L 63/0884* (2013.01); *H04W 12/06* (2013.01)

(58) Field of Classification Search
None
See application file for complete search history.

(56) References Cited

U.S. PATENT DOCUMENTS

| 2002/0013831 | A1* | 1/2002 | Astala et al. ................. 709/220 |
| 2002/0046353 | A1* | 4/2002 | Kishimoto .................... 713/202 |
| 2006/0190530 | A1* | 8/2006 | Gruneberg et al. ........... 709/203 |
| 2007/0300292 | A1* | 12/2007 | Scipioni et al. ................ 726/5 |

(Continued)

FOREIGN PATENT DOCUMENTS

WO    WO 2004056038 A1 *    7/2004

OTHER PUBLICATIONS

3GPP TR 33.924 V10.1.0, Technical Specification Group Services and System Aspects; Identity management and 3GPP security interworking; Identity management and Generic Authentication Architecture (GAA) interworking (Release 10), Jun. 2011.

*Primary Examiner* — Benjamin Lanier
(74) *Attorney, Agent, or Firm* — Jefferson IP Law, LLP

(57) ABSTRACT

A method of performing user authentication of a mobile station by proxy in a communication system is provided. The method includes receiving an authentication request, which requests authentication of a user, from an Internet service provider having received information indicating that the mobile station can perform authentication based on only the mobile station's own information, requesting the user to provide security identification information for authentication, receiving the security identification information input by the user, authenticating the user by determining whether the security identification information is valid information, through security-requiring information managed by the mobile station, and transmitting an authentication result to the Internet service provider and receiving an authorized authentication result from the Internet service provider and providing a service according to the authorized authentication result to the user.

8 Claims, 15 Drawing Sheets

(56) References Cited

U.S. PATENT DOCUMENTS

| | | | |
|---|---|---|---|
| 2008/0205642 A1* | 8/2008 | Yururi | 380/200 |
| 2009/0132718 A1* | 5/2009 | Groll et al. | 709/229 |
| 2009/0282466 A1* | 11/2009 | Uchida | 726/7 |
| 2009/0307764 A1* | 12/2009 | Isobe et al. | 726/7 |
| 2010/0015973 A1* | 1/2010 | Islam et al. | 455/434 |
| 2011/0078773 A1* | 3/2011 | Bhasin et al. | 726/5 |
| 2011/0237250 A1 | 9/2011 | Horn et al. | |
| 2013/0263239 A1* | 10/2013 | Lim et al. | 726/7 |

* cited by examiner

APPARATUS AND METHOD FOR PERFORMING USER AUTHENTICATION BY PROXY IN WIRELESS COMMUNICATION SYSTEM

PRIORITY

This application claims the benefit under 35 U.S.C. §119(a) of a Korean patent application filed on Mar. 27, 2012 in the Korean Intellectual Property Office and assigned Serial No. 10-2012-0030957, the entire disclosure of which is hereby incorporated by reference.

JOINT RESEARCH AGREEMENT

The presently claimed invention was made by or on behalf of the below listed parties to a joint research agreement. The joint research agreement was in effect on or before the date the claimed invention was made and the claimed invention was made as a result of activities undertaken within the scope of the joint research agreement. The parties to the joint research agreement are 1) SAMSUNG ELECTRONICS CO., LTD., and the 2) UNIVERSITY-INDUSTRY COOPERATION GROUP OF KYUNG HEE UNIVERSITY.

BACKGROUND OF THE INVENTION

1. Field of the Invention

The present invention relates to a communication system. More particularly, the present invention relates to an apparatus and a method for performing user authentication by proxy.

2. Description of the Related Art

The recent increase in the concern about the protection of personal information has been accompanied by a remarkable increase in the concern about the Open IDentifier (Open ID) service which enables a user to login to multiple Internet sites through a single IDentifier (ID), so as to minimize leakage of personal information. The Open ID service refers to a service in which a third party Internet service provider performs authentication of a user by proxy for an Internet service provider when the user accesses an Internet site of the Internet service provider. Therefore, a user can access all sites supporting the Open ID service with completion of authentication in only one site in which the user trusts, without making and managing a new account whenever the user visits each site.

FIGS. 1A and 1B are signal flow diagrams illustrating a process of authenticating a user by using an Open ID service in a communication system according to the related art.

Referring to FIGS. 1A and 1B, a mobile communication service provider 100 manages a Home Subscriber Server (HSS)/Home Location Register (HLR) 102 for managing subscriber information, a Bootstrapping Server Function (BSF) unit 104 for actually authenticating a user 130, and an Open ID Provider (OP)/Network Application Function (NAF) unit 106.

An Internet Service Provider (ISP) 110 manages a Relaying Party (RP) 112 which performs authentication of a user in cooperation with a third party organization.

A mobile station 120 manages a Browsing Agent (BA) providing a web browser and an Authentication Agent (AA) providing an authentication service, and the BA and AA are dealt with as a single integrated element, i.e., a BA/AA 122, in the following description.

The user 130 accesses the ISP 110 by executing a web browser of an Internet site which the user wants to access through the BA/AA 122 in step 140. Further, when there is a request for access information from the Internet site which the user wants to access, the user 130 selects a mode for authenticating the user by using an Open ID service. Then, the user 130 inputs identification information, e.g., a User Supplied Identifier (e.g., USI), to be used in a third party organization which performs user authentication by proxy through the Open ID service in step 142. The identification information may include a Uniform Resource Identifier (URI), a Uniform Resource Locator (URL), an Extensible Resource Identifier (XRI), or a Mobile Station International Subscriber Directory Number (MSISDN), as well as the USI. Further, FIGS. 1A and 1B are based on an assumption that the third party organization is the illustrated mobile communication service provider 100.

The RP 112 of the ISP 110 extracts an OP address of the third party organization which performs user authentication by proxy from the identification information input by the user 130 in step 144, and sets a security providing communication link with the third party organization, i.e., the mobile communication service provider 100 in step 146. In order to set the communication link, the Diffie Hellman (DH) key exchange scheme may be used, although it is optional to use this scheme.

Further, the RP 112 of the ISP 110 transmits the web browser of the Internet site which the user 130 wants to access, the USI input by the user 130, and an authentication request through an Open ID to the mobile station 120 in step 148, and the mobile station 120 transmits a Hyper Text Transfer Protocol (HTTP) Get Request message including the USI input by the user 130 and the authentication request through an Open ID to the OP/NAF unit 106 of the mobile communication service provider 100 in step 150. Then, the OP/NAF unit 106 starts to authenticate the user 130 in step 152. In this event, it is assumed that the OP unit 106 also performs an NAF of the mobile communication service provider 100.

The OP/NAF unit 106 of the mobile communication service provider 100 transmits a Hypertext Transfer Protocol Secure (HTTPS) Response 401 Unauthorized message, which notifies of the starting of the authentication, to the mobile station 120 in step 154, and the mobile station 120 transmits an HTTP Get Request message to the BSF unit 104 of the mobile communication service provider 100 as a response to the HTTPS Response 401 Unauthorized message in step 156. In this event, the HTTP Get Request message includes the USI input by the user 130.

The BSF unit 104 of the mobile communication service provider 100 acquires additional information used for the authentication of the user 130 from the HSS/HLR 102 in step 158, and the BSF unit 104 transmits a 401 Unauthorized message, which requests an Authentication and Key Agreement (AKA), to the mobile station 120 in step 160.

According to the request, the mobile station 120 performs an AKA algorithm in step 162 and transmits a Request Authorization Digest message including a result of execution of the AKA algorithm to the BSF unit 104 of the mobile communication service provider 100 in step 164.

The BSF unit 104 of the mobile communication service provider 100 determines the suitability of the mobile station based on the result of execution of the AKA algorithm received from the mobile station 120 in step 166, and transmits a 200 OK message including authentication key information according to a result of the determination to the mobile station 120 in step 168. The 200 OK message includes lifetime information for valid use of the authentication key in future processes. The mobile station 120 transmits the authentication information to the OP/NAF unit 106 of the mobile communication service provider 100 through an HTTP Get Request message in step 170.

The OP/NAF unit 106 of the mobile communication service provider 100 accesses the BSF unit 104 and requests information on the authentication key received from the mobile station 120 in step 172, and the BSF unit 104 provides the authentication key information to the OP/NAF unit 106 in step 174.

The OP/NAF unit 106 of the mobile communication service provider 100 determines whether the authentication key identified through the mobile station 120 and the authentication key information identified through the BSF unit 104 are identical to each other and, when they are identical, transmits the web browser of the Internet site, which the user 130 of the mobile station 120 wants to access, together with a result of the authentication, to the mobile station 120 in step 176, and the mobile station 120 transmits the result of the authentication to the RP 112 in step 178.

The RP 112 of the ISP 110 authorizes the authentication result in step 180, and displays the authorized authentication result to provide the user 130 with a service according to authentication success or failure in step 182.

The above description with reference to FIGS. 1A and 1B discusses a process of authenticating a user by using an Open ID service in a communication system according to the related art. However, in order to perform the process described above, there are 13 message transmissions or receptions between the mobile station 120 and the Internet site of the ISP 110, which includes steps 140, 142, 148, 150, 154, 156, 160, 164, 168, 170, 176, 178, and 182. Such a frequent message transmission or reception increases use of wireless traffic and thereby prolongs the time for login in view of the user. Therefore, there is a need for a scheme capable of minimizing the number of message transmissions or receptions and thereby minimizing the amount of time for login in view of the user. Further, there is a need for a scheme which enables a mobile communication service provider to secure economic compensation for wireless traffic used for the Open ID authentication.

Moreover, since the Open ID is mainly applied to a computer-centered web browser environment, there is a need to improve the Open ID service so that the Open ID can be used in an environment centered on application programs of the mobile station, such as a smart phone or a tablet computer.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below. Accordingly, an aspect of the present invention is to provide an apparatus and a method for performing user authentication by proxy through a simplified process between an Internet service provider and a mobile station.

In accordance with an aspect of the present invention, a method of performing user authentication of a mobile station by proxy in a communication system proposed by the present invention is provided. The method includes receiving an authentication request, which requests authentication of a user, from an Internet service provider having received information indicating that the mobile station can perform authentication based on only the mobile station's own information, requesting the user to provide security identification information for authentication, receiving the security identification information input by the user, authenticating the user by determining whether the security identification information is valid information, through security-requiring information managed by the mobile station, and transmitting an authentication result to the Internet service provider, and receiving an authorized authentication result from the Internet service provider and providing a service according to the authorized authentication result to the user.

In accordance with an aspect of the present invention, a method of performing user authentication of a mobile station by proxy in a communication system proposed by the present invention is provided. The method includes determining whether authentication information of an Internet site which a user wants to access exists, when the authentication information does not exist, performing a predetermined authentication algorithm in response to a request from a mobile communication service provider and transmitting a result of the performing of the predetermined authentication algorithm to the mobile station service provider, receiving a user authentication result through a permanent authentication key generated according to the result of the performing of the predetermined authentication algorithm and providing the user authentication result to the Internet service provider, and receiving an authorized authentication result from the Internet service provider and providing the user with a service according to the authorized authentication result.

In accordance with an aspect of the present invention, a mobile station for performing user authentication by proxy in a communication system proposed by the present invention is provided. The mobile station includes a user interface for requesting a user to provide security identification information for authentication of the user and for receiving the security identification information input by the user, and a security local web server for receiving an authentication request, which requests authentication of the user, from an Internet service provider having received information indicating that the mobile station can perform authentication based on only the mobile station's own information, for authenticating the user by determining whether the security identification information is valid information, through security-requiring information managed by the mobile station, for transmitting an authentication result to the Internet service provider, for receiving an authorized authentication result from the Internet service provider, and for providing a service according to the authorized authentication result to the user.

In accordance with an aspect of the present invention, a mobile station for performing user authentication by proxy in a communication system proposed by the present invention is provided. The mobile station includes a security local web server for determining whether authentication information of an Internet site which a user wants to access exists, for performing a predetermined authentication algorithm in response to a request from a mobile communication service provider and transmitting a result of the performing of the predetermined authentication algorithm to the mobile station service provider when the authentication information does not exist, for receiving a user authentication result through a permanent authentication key generated according to the result of the performing of the predetermined authentication algorithm and providing the user authentication result to the Internet service provider, and for receiving an authorized authentication result from the Internet service provider and providing the user with a service according to the authorized authentication result.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

It is to be understood that the singular forms "a," "an," and "the" include plural referents unless the context clearly dictates otherwise. Thus, for example, reference to "a component surface" includes reference to one or more of such surfaces.

Figure 1A:
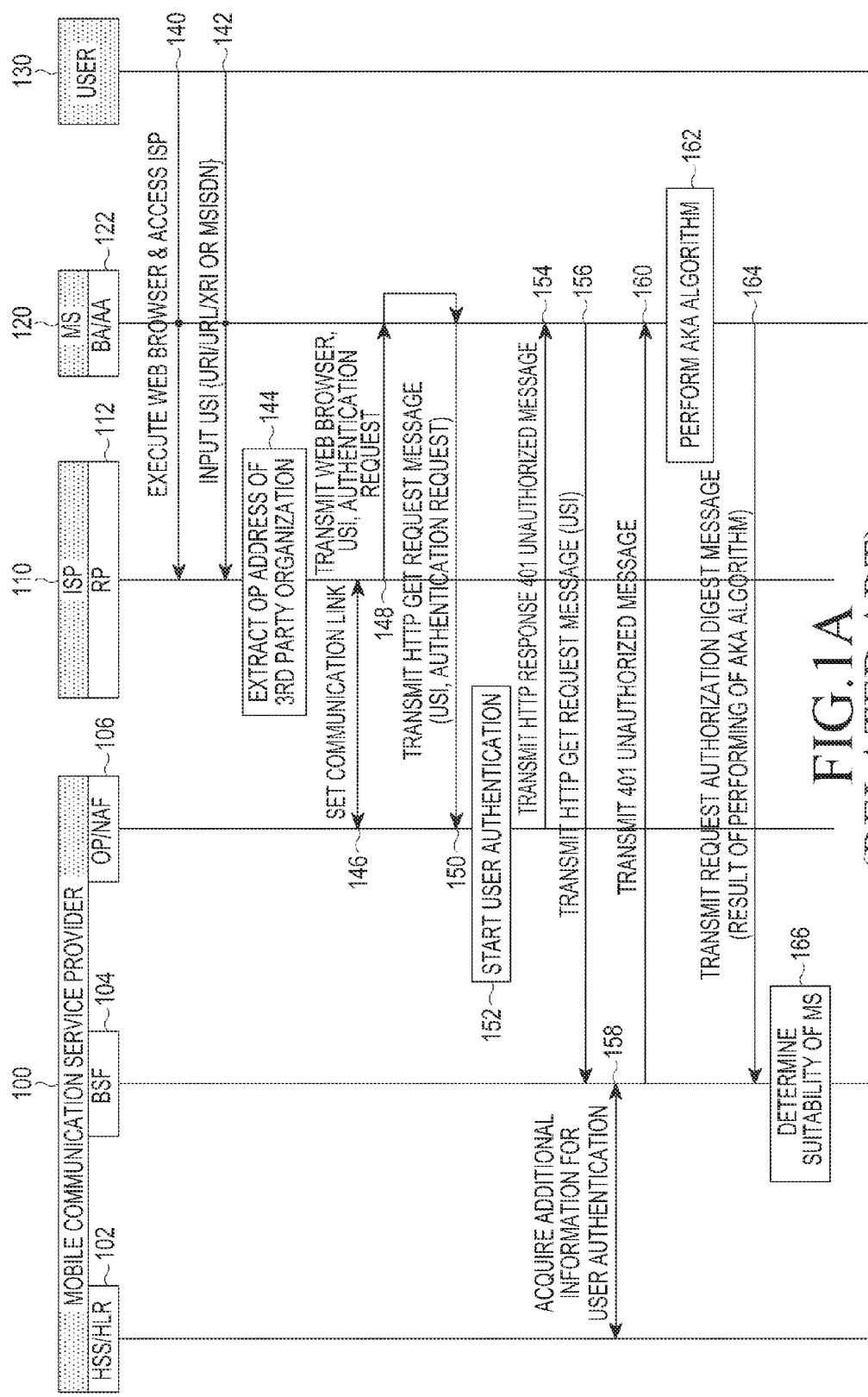
FIGS. 1A and 1B are signal flow diagrams illustrating a process of authenticating a user by using an Open IDentifier (ID) service in a communication system according to the related art.
Figure 1B:
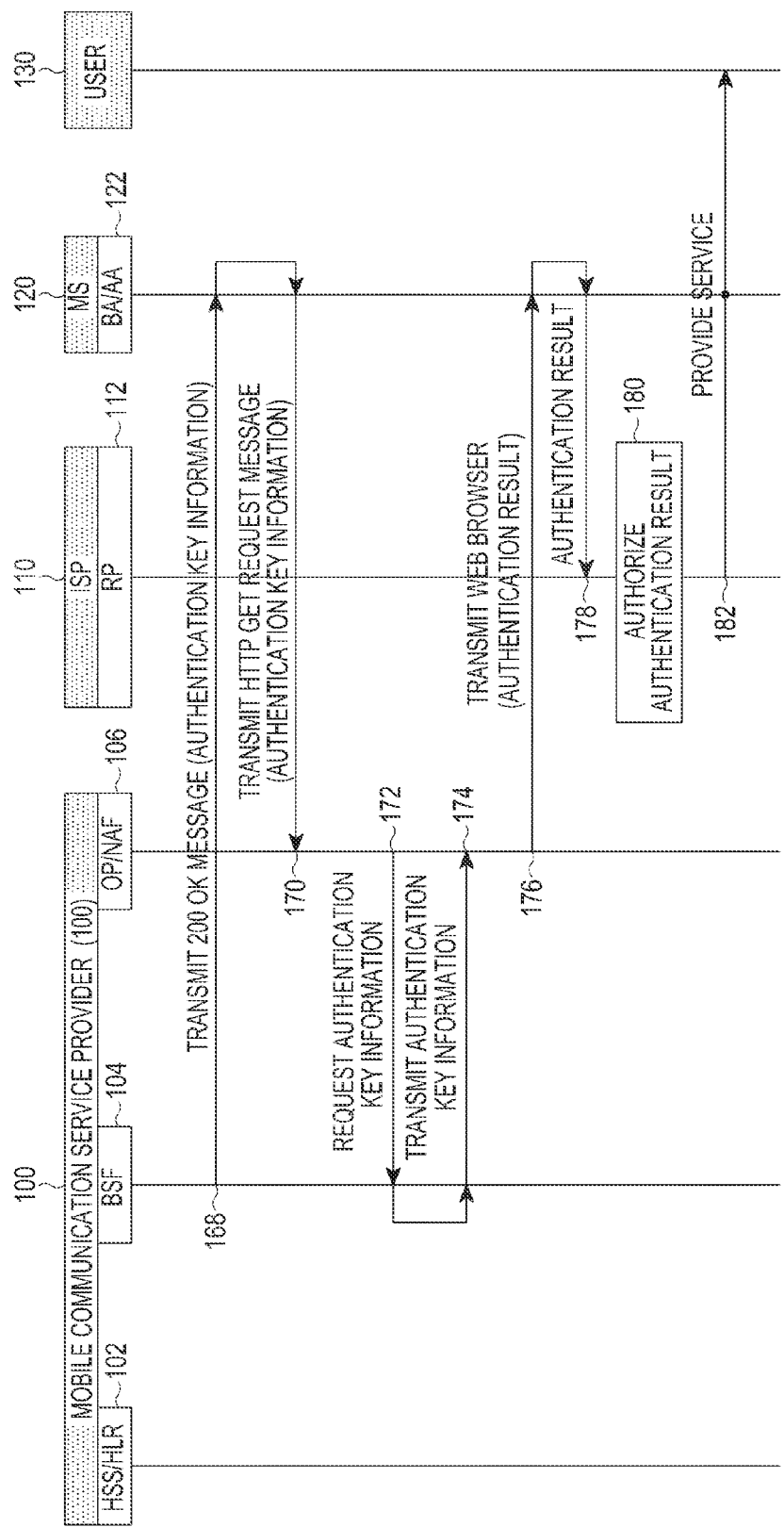
Figure 2:
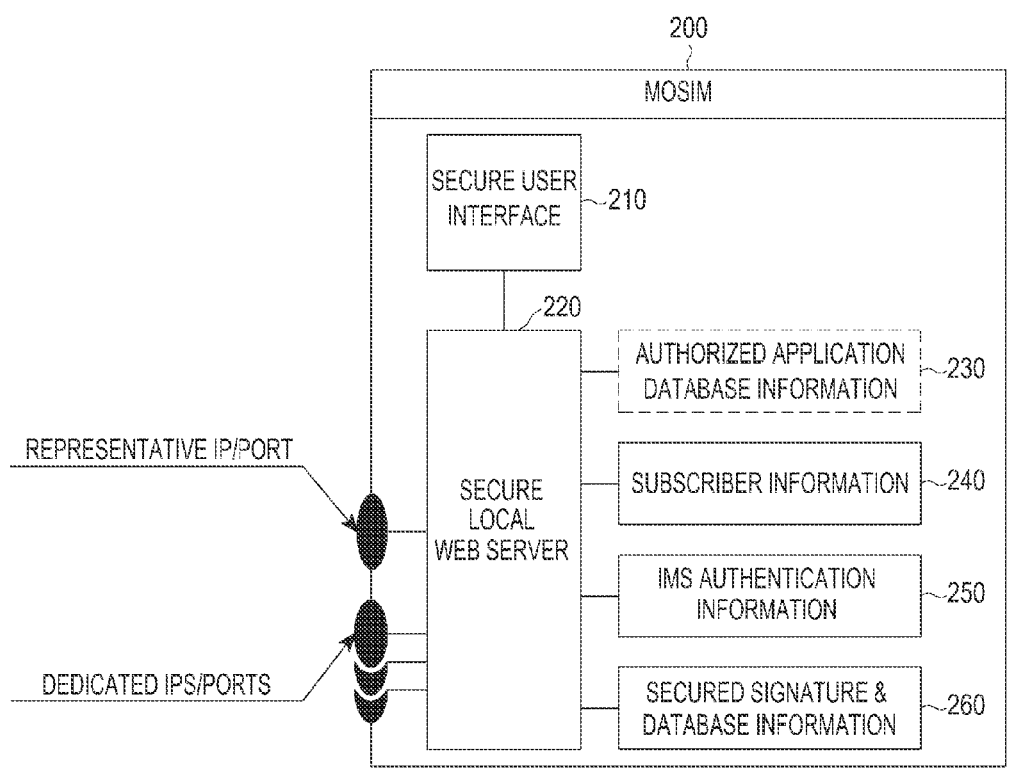
FIG. 2 is a view illustrating a structure of a mobile security information manager included in a mobile station in a communication system according to an exemplary embodiment of the present invention.

FIG. 2 is a view illustrating a structure of a mobile security information manager included in a mobile station in a communication system according to an exemplary embodiment of the present invention.

Referring to FIG. 2, the illustrated Mobile Security Information Manager (MOSIM) 200 includes a secure user interface 210 and a secure local web server 220. The secure local web server 220 manages authorized application database information 230, subscriber information 240 installed in and managed by a mobile station, such as Universal Integrated Circuit Card (UICC) information and Universal Subscriber Identity Module (USIM) information, Internet Protocol Multimedia Subsystem (IMS) authentication information 250, and secured signature and database information 260.

The secure local web server 220 has one representative Internet Protocol (IP)/port and at least two dedicated IPs/ports.

The representative IP/port has a fixed IP address and a fixed port number, and especially has an open address value which allows any application program to access information which guarantees the security of the mobile station. For example, a Hypertext Transfer Protocol Secure (HTTPS) protocol message guaranteeing the security is transmitted or received through a corresponding IP address and port number.

If an application program wants to access information guaranteeing the security, a request for the access may be subjected to a confirmation by the user through the secure user interface 210 guaranteeing the security. This confirmation corresponds to an additional function which is not necessarily required and is employed only when the user performs a more reliable access control with respect to access to information guaranteeing the security.

Further, the authorized application database information 230 includes, for example, access-allowed application program information and access-denied application program information.

The dedicated IPs/ports are allocated for an application program which tries to access information continuously guaranteeing the security thereof, and a more careful management in relation to use of security information of a particular application program can be achieved by allocating a corresponding particular IP address and port number to the particular application program.

Figure 3:
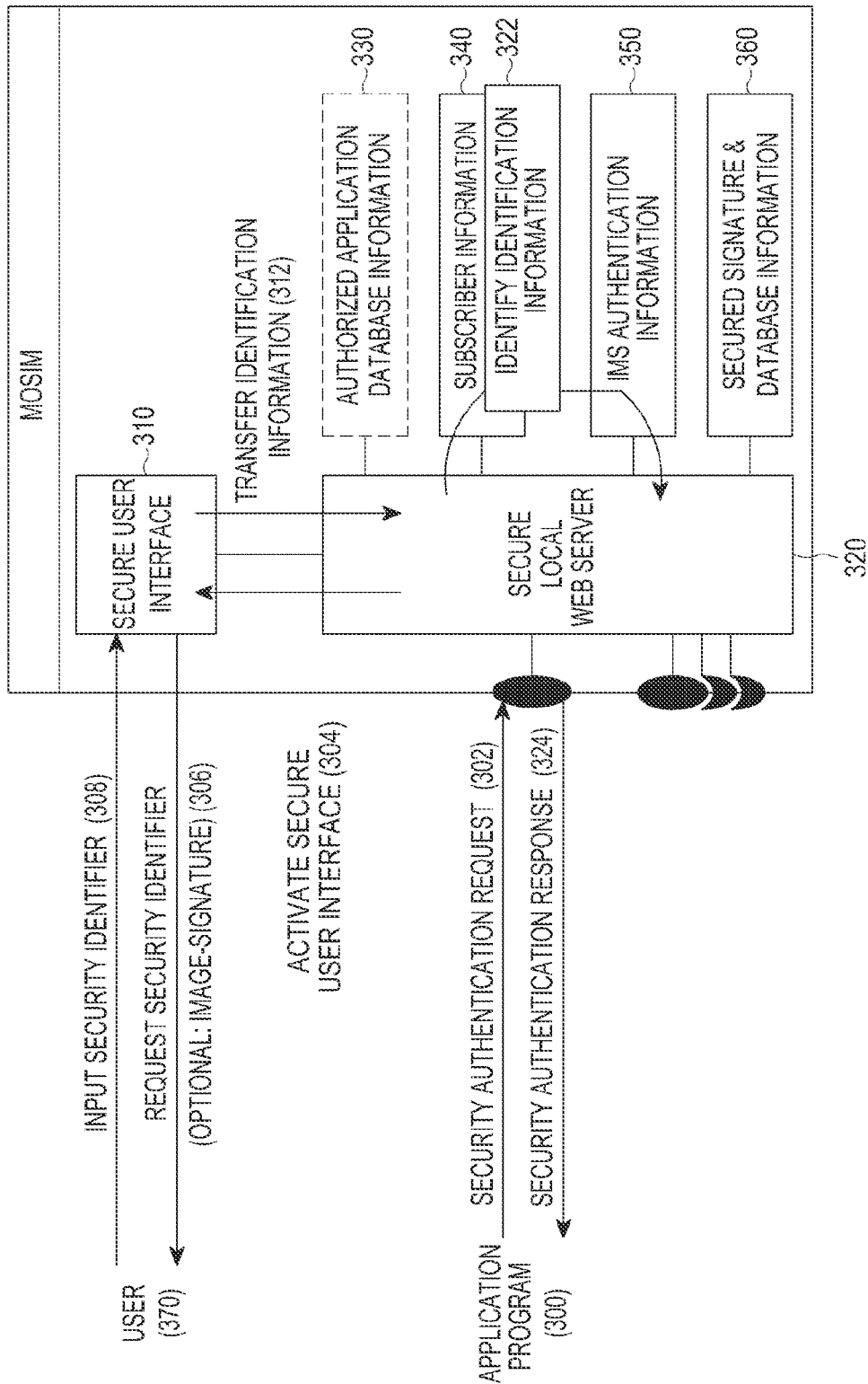
FIG. 3 is a view illustrating an operation of authenticating a particular program of a Mobile Security Information Manager (MOSIM) included in a mobile station in a communication system according to an exemplary embodiment of the present invention.

FIG. 3 is a view illustrating an operation of authenticating a particular program of a MOSIM included in a mobile station in a communication system according to an exemplary embodiment of the present invention.

Referring to FIG. 3, an application program 300, which wants to obtain authentication of its legitimacy, accesses a secure local web server 320 through a representative IP/port and requests a security authentication guaranteeing the security in step 302, and the secure local web server 320 activates a secure user interface 310 guaranteeing the security within the MOSIM in step 304. Then, the secure user interface 310 requests a user 370 to provide security identification information (e.g., an identifier and a password) for authentication in step 306, so as to determine whether the access of the application program is legitimate. For example, the secure user interface 310 determines whether the user 370 currently wants to use the application program 300, determines whether the application program 300 is a legitimate program, and determines whether the application program 300 is allowed to legitimately use important information of the mobile station, the security of which is desired.

When a security identifier for authentication is input from the user 370 in step 308, the secure user interface 310 transmits the security identification information to the secure local web server 320 in step 312. In this event, in order to mitigate keyboard hacking by another application program, the secure user interface 310 may display a picturized signature to enable the user 370 to input security identification information for user authentication.

The secure local web server 320 determines whether the identifier input by the user 370 is correct, through the security-requiring information managed by the secure local web server 320 itself, which includes authorized application database information 330, subscriber information 340, IMS authentication information 350, and secured signature and database information 360 in step 322. Here, it is assumed that the security-requiring information managed by the secure local web server 320 includes information by which it is possible to determine whether the identifier input by the user 370 is correct.

Thereafter, the secure local web server 320 transmits a security authentication response including the determined authentication result to the application program 300 through the representative IP/port in step 324. For example, when the user 370 has input a correct identifier so that a particular application program is allowed to access information guaranteeing the security, the secure local web server 320 determines that the authentication of the particular application program has been successfully achieved and transfers a result of the determination to the application program 300. However, when the user 370 inputs an incorrect identifier or an application program (such as an illegal request) which the user does not know sends a request for authentication, the secure local web server 320 denies that request for authentication.

Figure 4:
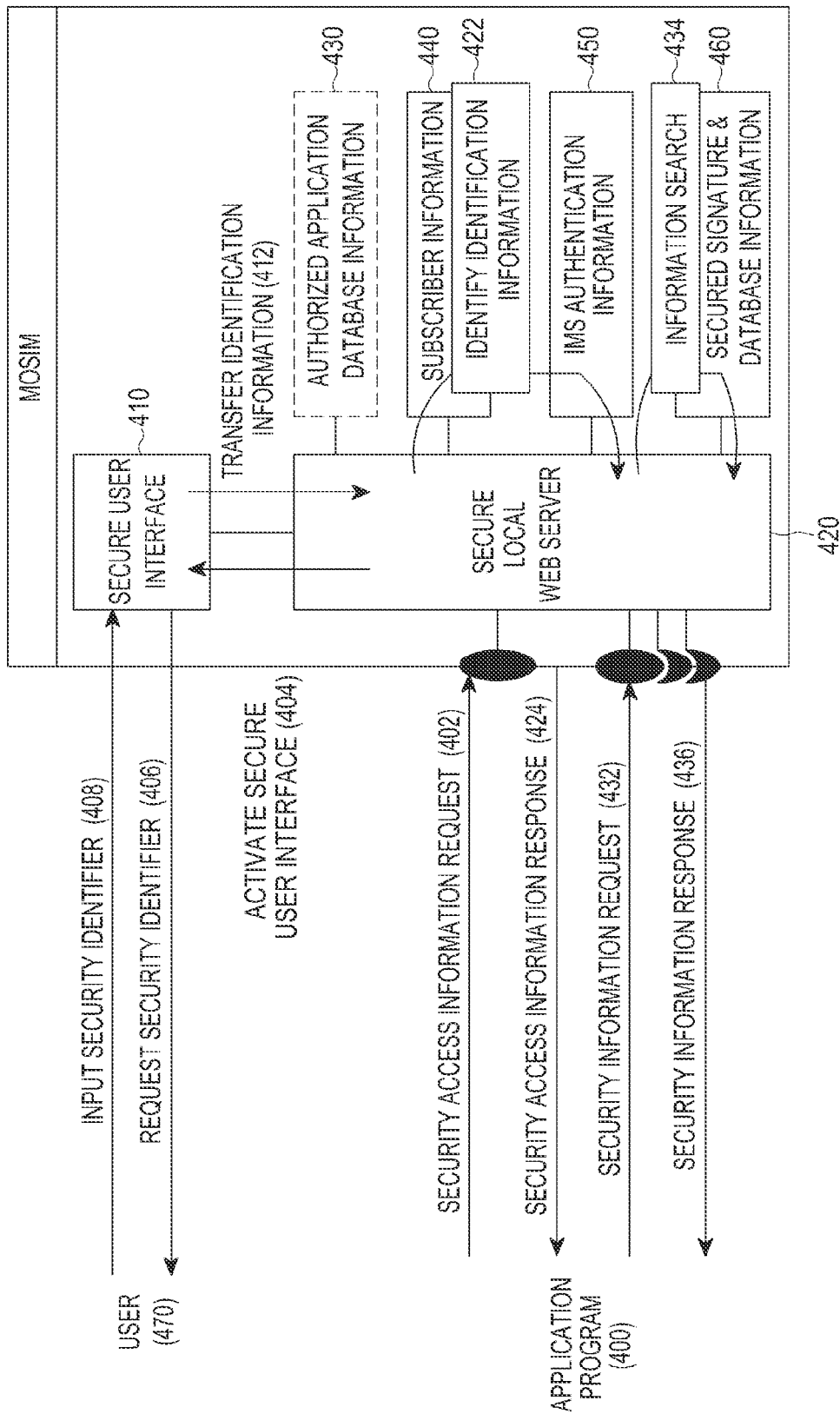
FIG. 4 is a view illustrating an operation of allowing a particular program of a MOSIM included in a mobile station to access information continuously guaranteeing a security in a communication system according to an exemplary embodiment of the present invention.

FIG. 4 is a view illustrating an operation of allowing a particular program of a MOSIM included in a mobile station to access information continuously guaranteeing the security in a communication system according to an exemplary embodiment of the present invention.

Referring to FIG. 4, an application program 400, which wants to obtain authentication of its legitimacy, accesses a secure local web server 420 through a representative IP/port and requests a security access information guaranteeing the security in step 402, and the secure local web server 420 activates a secure user interface 410 guaranteeing the security within the MOSIM in step 404. Then, the secure user interface 410 requests a user 470 to provide security identification information (e.g., an identifier and a password) for authentication in step 406, so as to determine whether the access of the application program is legitimate. For example, the secure user interface 410 determines whether the user 470 currently wants to use the application program 400, determines whether the application program 400 is a legitimate program, and determines whether the application program 400 is allowed to legitimately use important information of the mobile station, the security of which is desired.

When a security identifier for authentication is input from the user 470 in step 408, the secure user interface 410 transmits the security identification information to the secure local web server 420 in step 412. In this event, in order to mitigate keyboard hacking by another application program, the secure user interface 410 may display a picturized signature to enable the user 470 to input security identification information for user authentication.

The secure local web server 420 determines whether the identifier input by the user 470 is correct, through the security-requiring information managed by the secure local web server 420 itself, which includes authorized application database information 430, subscriber information 440, IMS authentication information 450, and secured signature and database information 460 in step 422. Here, it is assumed that the security-requiring information managed by the secure local web server 420 includes information by which it is possible to determine whether the identifier input by the user 470 is correct.

Thereafter, the secure local web server 420 transmits a security access information response including the determined authentication result to the application program 400 through the representative IP/port in step 424. For example, when the user 470 has input a correct identifier so that a particular application program is allowed to access information guaranteeing the security, the secure local web server 420 determines that the authentication of the particular application program has been successfully achieved and transfers a result of the determination to the application program 400. Since FIG. 4 is based on an operation allowing the application program to access information continuously guaranteeing the security, only the case in which authentication key information for the program has been successfully achieved is discussed here.

After allowing the application program 400 to access information continuously guaranteeing the security, the secure local web server 420 allocates at least two dedicated IPs/ports to be exclusively used by the application program 400 to the application program 400. The application program 400 sends a request for security information to the secure local web server 420 through the allocated at least two dedicated IPs/ports in step 432. The secure local web server 420 searches for the security information through authorized application database information 430, subscriber information 440, IMS authentication information 450, and secured signature and database information 460 in step 434. Thereafter, the secure local web server 420 transmits a security information response to the application program 400 through the allocated at least two dedicated IPs/ports in step 436.

Figure 5:
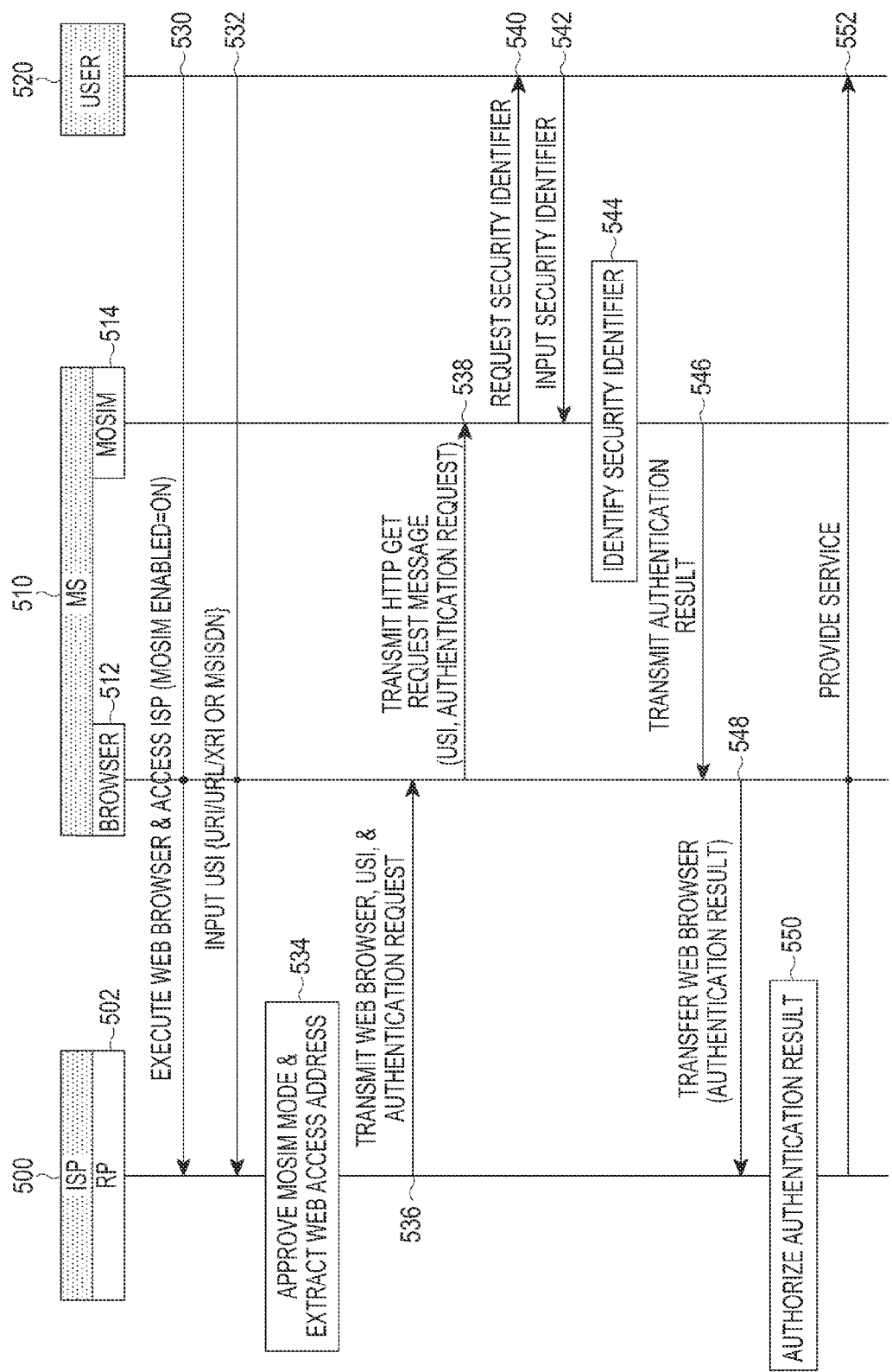
FIG. 5 is a signal flow diagram illustrating a process of authenticating a user by a mobile station itself including a MOSIM in a communication system according to an exemplary embodiment of the present invention.

FIG. 5 is a signal flow diagram illustrating a process of authenticating a user by a mobile station itself including a MOSIM in a communication system according to an exemplary embodiment of the present invention.

Referring to FIG. 5, an ISP 500 manages an RP 502 performing user authentication and a mobile station 510 manages a browser 512 and a MOSIM 514.

A user 520 accesses the ISP 500 by executing a web browser of an Internet site, which the user wants to access, through the browser 512 in step 530. As soon as the user 520 accesses the ISP 500, the user 520 inputs information (such as "MOSIM Enabled=ON") indicating that the mobile station 510 of the user 520 has a MOSIM 514 and thus can perform authentication based on only its own information managed by the MOSIM 514. The present exemplary embodiment shows an example in which information indicating that authentication can be performed based on only its own information managed by the MOSIM 514 is implemented in the form of "MOSIM Enabled=ON". However, it goes without saying that such information can be implemented in any form.

Further, when there is a request for access information from the Internet site which the user wants to access, the user 520 selects a MOSIM mode for authenticating the user by using the MOSIM and inputs identification information (e.g., a User Supplied Identifier (USI)) to be used in user authentication through the MOSIM mode in step 532. In this event, the identifier may be URI, URL, XRI, or MSISDN.

The RP 502 of the ISP 500 approves the MOSIM mode and extracts a port number and a web access address (i.e., local IP address) of the MOSIM which are defined as fixed values in step 534.

Further, the RP 502 of the ISP 500 transmits a web browser of the Internet site which the user 520 wants to access, identification information (e.g., USI) input by the user 520, and an authentication request through the MOSIM to the browser 512 of the mobile station 510 in step 536. The mobile station 510 transmits an HTTP Get Request message including the authentication request and the identification information (e.g., USI) input by the user 520 to the MOSIM 514 through the port number and the web access address (i.e., local IP address) extracted in step 534 in step 538.

Then, the MOSIM 514 requests the user 520 to provide security identification information (e.g., an identifier and a password) for authentication in step 540, and the user 520 inputs the requested security identification information through the MOSIM 514 in step 542. In this event, in order to mitigate keyboard hacking by another application program, the MOSIM 514 may display a picturized signature to enable the user 520 to input security identification information for user authentication.

Upon receiving the input security identification information, the MOSIM 514 determines whether the security identification information is valid information to authenticate the user 520 having input the security identification information in step 544, and then transmits the authentication result to the browser 512 of the mobile station 510 in step 546. The browser 512 of the mobile station 510 transfers a web browser of the Internet site which the user 520 wants to access, together with the authentication result, to the RP 502 of the ISP 500 in step 548, and the RP 502 of the ISP 500 authorizes the authentication result in step 550. Further, the RP 502 of the ISP 500 displays the authorized authentication result to provide the user 520 with a service according to authentication success or failure in step 552.

The above description with reference to FIG. 5 discusses a process of authenticating a user by a mobile station itself providing a MOSIM in a communication system. The process of authenticating a user by a mobile station itself providing a MOSIM as described above uses five steps of message transmission or reception for completion of user authentication, in comparison with the related-art authentication process using the Open ID service, which uses a total of 13 message transmissions or receptions.

The authentication process shown in FIG. 5 may be used when the MOSIM is implemented as a module to which the security is provided through a combination of hardware and software, such as the Secure Execution Environment (SEE). However, if a hacker has intentionally developed fakes of both of the MOSIM and the browser of the mobile station, it is not possible to achieve exact authentication by the authentication process. In other words, if a hacker intentionally implements a fake MOSIM and transmits an HTTP Get Request message for authentication request to the fake MOSIM, the fake MOSIM may determine and deal with the authentication request as a legitimate authentication.

As a technique for addressing the problem described above, an improved authentication scheme will be described hereinafter with reference to FIGS. 6 and 7, in which a mobile station and an ISP generate an authentication key to authenticate each other at the initial service beginning time point and use the generated authentication key in all the user authentication processes thereafter, so as to reduce the time spent for the authentication process and further reinforce the security.

In the improved authentication scheme, a mobile station generates a permanent authentication key only once to authenticate a user by performing the process shown in FIGS. 6A and 6B when the mobile station initially accesses an Internet site of a particular ISP, and then authenticates the user by using the already generated permanent authentication key by performing the process shown in FIG. 7 in the following processes.

Figure 6A:
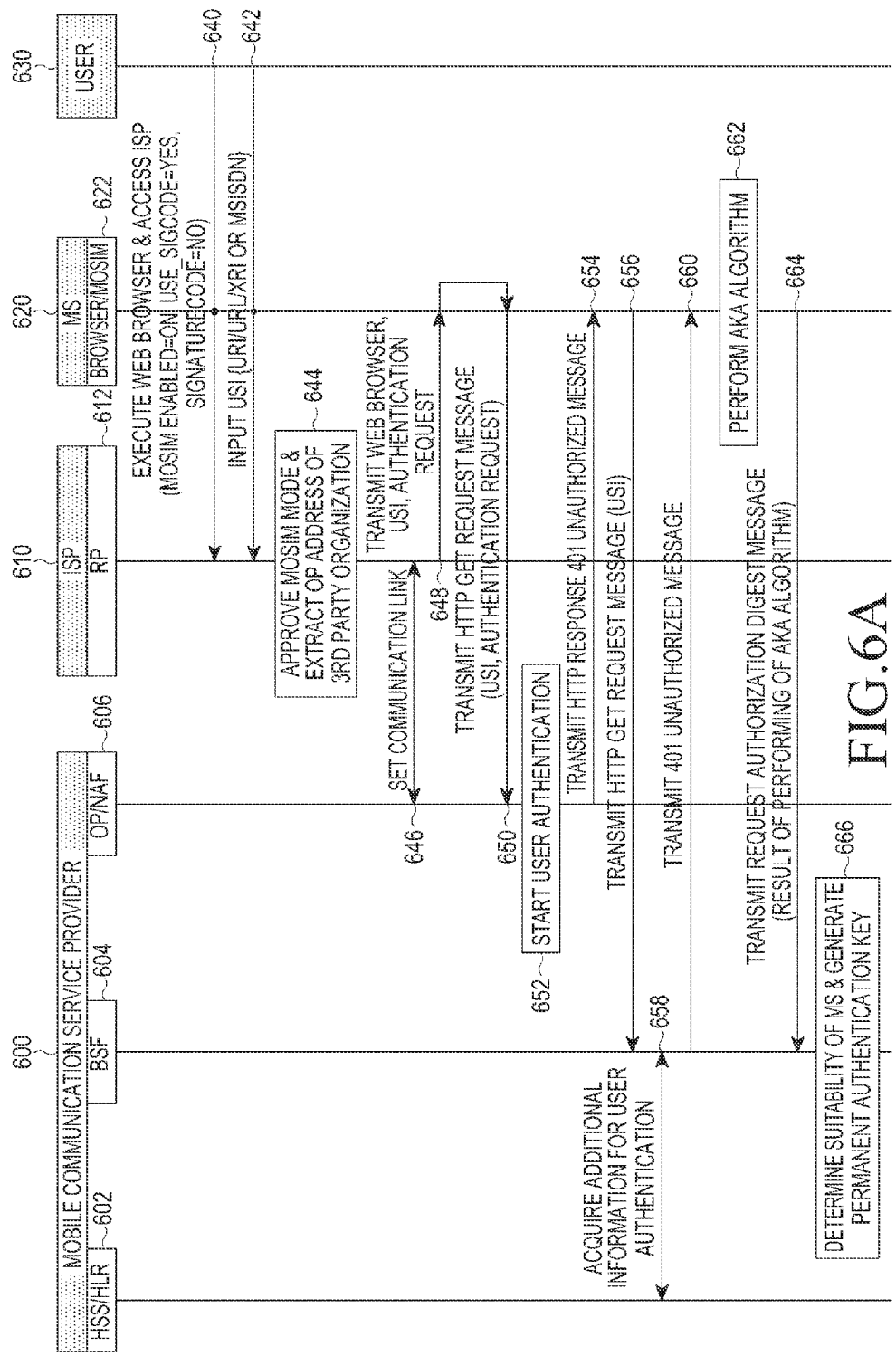
FIGS. 6A and 6B are signal flow diagrams illustrating a process of generating a permanent authentication key by a mobile station providing a MOSIM in a communication system according to an exemplary embodiment of the present invention.
Figure 6B:
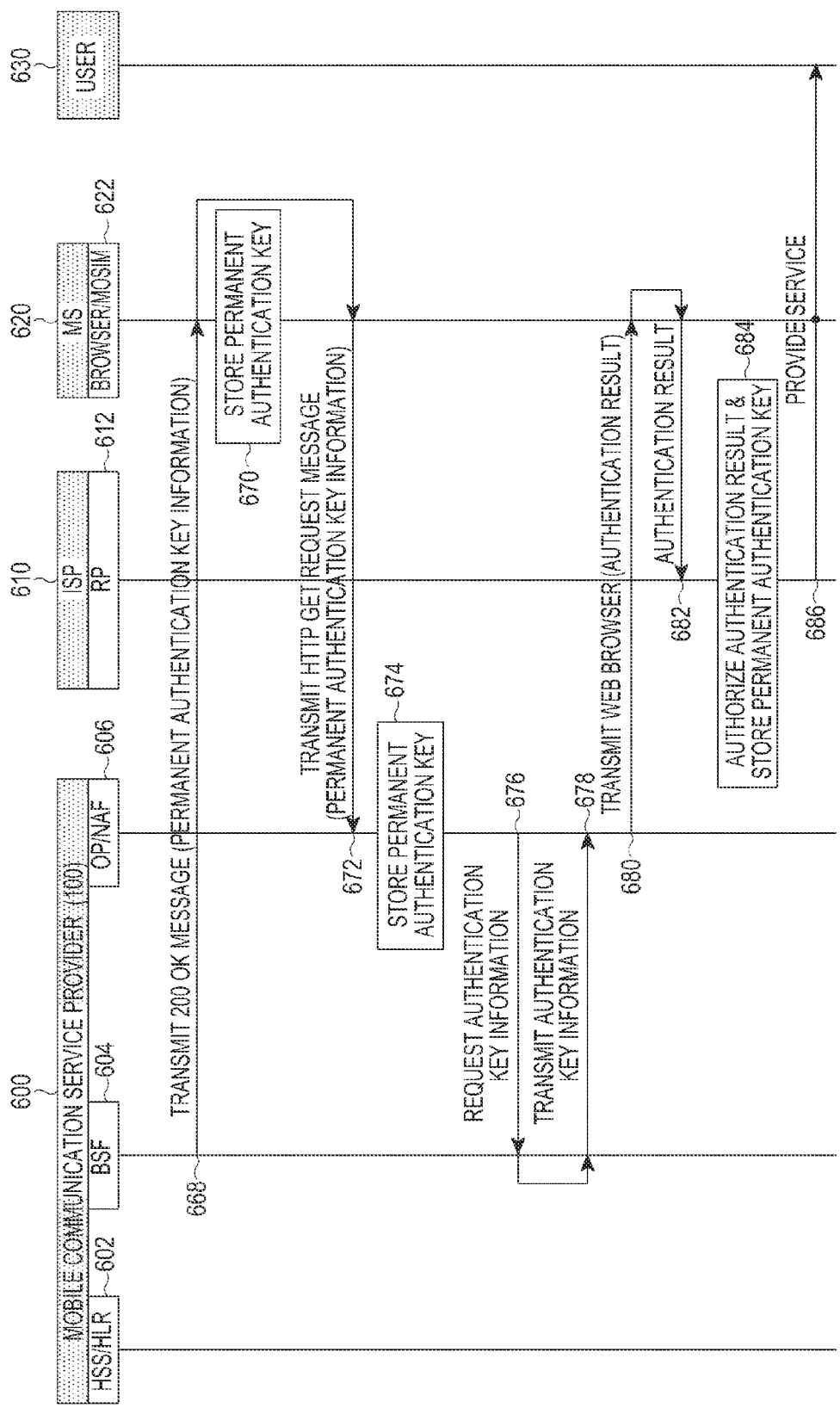

FIGS. 6A and 6B are signal flow diagrams illustrating a process of generating a permanent authentication key by a mobile station providing a MOSIM in a communication system according to an exemplary embodiment of the present invention. The process shown in FIGS. 6A and 6B is performed only once when the mobile station initially accesses an Internet site of a particular ISP.

Referring to FIGS. 6A and 6B, a mobile communication service provider 600 manages an HSS/HLR 602 for managing subscriber information, a BSF unit 604 for actually authenticating a user 630, and an OP/NAF unit 606. An ISP 610 manages an RP 612 which performs user authentication, and a mobile station 620 manages a browser/MOSIM 622.

The user 630 accesses the ISP 610 by executing a web browser of an Internet site which the user wants to access through the browser/MOSIM 622 in step 640. In this event, as soon as the user 630 accesses the ISP 610, the user 630 inputs "MOSIM Enabled=ON" information, "USE_SIGCODE=YES" information, and "SignatureCode=NO" information in step 640. The "MOSIM Enabled=ON" information is information indicating that the mobile station 620 of the user has a MOSIM and thus can perform authentication based on only its own information managed by the MOSIM, the "USE_SIGCODE=YES" information is information indicating that the mobile station 620 and the network generate and manage an authentication code shared by each other, and the "SignatureCode=NO" information is information indicating that the mobile station 620 does not have authentication information of the Internet site of the ISP 610. The "MOSIM Enabled=ON" information, the "USE_SIGCODE=YES" information, and the "SignatureCode=NO" information correspond to only examples, and it may be implemented in any other form.

Further, when there is a request for access information from the Internet site which the user wants to access, the user 630 selects a MOSIM mode for authenticating the user by using the MOSIM, and inputs identification information, e.g., a USI, to be used in user authentication through the MOSIM mode in step 642. The identification information may include a URI, a URL, an XRI, or an MSISDN.

The RP 612 of the ISP 610 approves the MOSIM mode and extracts an OP address of a third party organization which performs user authentication by proxy from the identification information input by the user 630 in step 644, and sets a security providing communication link with the third party organization, i.e., the mobile communication service provider 600 in step 646. In order to set the communication link, the DH key exchange scheme may be used, although it is optional to use this scheme.

Further, the RP 612 of the ISP 610 transmits the web browser of the Internet site which the user 630 wants to access, the USI input by the user 630, and an authentication request through an Open ID to the browser/MOSIM 622 in step 648, and the mobile station 620 transmits an HTTP Get Request message including the USI input by the user 630 and the authentication request through the MOSIM to the OP/NAF unit 606 of the mobile communication service provider 600 in step 650. Then, the OP/NAF unit 606 starts to authenticate the user 630 in step 652. The NAF unit of the mobile communication service provider 600 transmits an HTTPS Response 401 Unauthorized message, which notifies of the starting of the authentication, to the mobile station 620 in step 654, and the mobile station 620 transmits an HTTP Get Request message to the BSF unit 604 of the mobile communication service provider 600 as a response to the HTTPS Response 401 Unauthorized message in step 656. In this event, the HTTP Get Request message includes the USI input by the user 630.

The BSF unit 604 of the mobile communication service provider 600 acquires additional information used for the authentication of the user 630 from the HSS/HLR 602 in step 658, and the BSF unit 604 transmits a 401 Unauthorized message, which requests an Authentication and Key Agreement (AKA), to the mobile station 620 in step 660.

According to the request, the mobile station 620 performs an AKA algorithm in step 662 and transmits a Request Authorization Digest message including a result of execution of the AKA algorithm to the BSF unit 604 of the mobile communication service provider 600 in step 664.

The BSF unit 604 of the mobile communication service provider 600 determines the suitability of the mobile station based on the result of execution of the AKA algorithm received from the mobile station 620 and the mobile station 620 and the ISP 610 generate an authentication key for authenticating each other in step 666. Further, the BSF unit 604 of the mobile communication service provider 600 transmits a 200 OK message including the authentication key according to a result of the determination to the mobile station 620 in step 668. The 200 OK message includes lifetime information for valid use of the authentication key in future processes. Since the authentication key is permanently used in the following processes, the authentication key generated in step 666 is called a permanent authentication key. The permanent authentication key may be implemented in the form of a code.

The mobile station 620 stores the permanent authentication key received from the BSF unit 604 of the mobile communication service provider 600 in step 670, and transmits the permanent authentication key information to the OP/NAF unit 606 of the mobile communication service provider 600 through an HTTP Get Request message in step 672. Then, the OP/NAF unit 606 of the mobile communication service provider 600 stores the permanent authentication key received from the mobile station 620 in step 674.

The OP/NAF unit 606 of the mobile communication service provider 600 accesses the BSF unit 604 and requests information on the permanent authentication key received from the mobile station 620 in step 676, and the BSF unit 604 provides the permanent authentication key information to the OP/NAF unit 606 in step 678.

The OP/NAF unit 606 of the mobile communication service provider 600 determines whether the authentication key identified through the mobile station 620 and the authentication key information identified through the BSF unit 604 are identical to each other and, when they are identical, transmits the web browser of the Internet site, which the user 630 of the mobile station 620 wants to access, together with a result of the authentication, to the mobile station 620 in step 680, and the mobile station 620 transmits the result of the authentication to the RP 612 in step 682.

The RP 612 of the ISP 610 stores the permanent authentication key and authorizes the authentication result in step 684. Further, the RP 612 of the ISP 610 displays the authorized authentication result to provide the user 630 with a service according to authentication success or failure in step 686.

Figure 7:
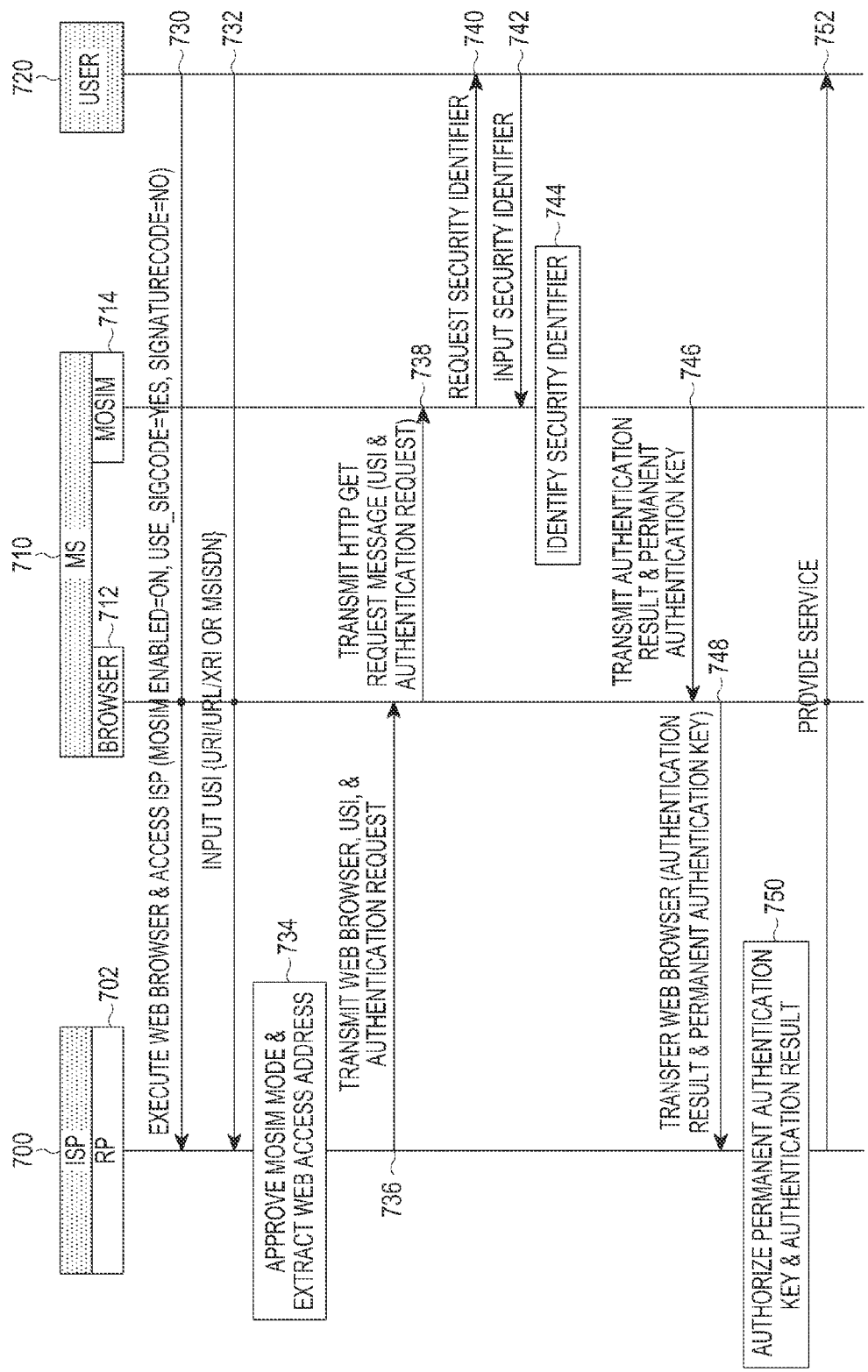
FIG. 7 is a signal flow diagram illustrating a process of authenticating a user by using an already generated permanent authentication key by a mobile station providing a MOSIM in a communication system according to an exemplary embodiment of the present invention.

FIG. 7 is a signal flow diagram illustrating a process of authenticating a user by using an already generated permanent authentication key by a mobile station providing a MOSIM in a communication system according to an exemplary embodiment of the present invention. The process described below with reference to FIG. 7 is applicable to a case where an already generated permanent authentication key exists.

Referring to FIG. 7, an ISP 700 manages an RP 702 performing user authentication and a mobile station 710 manages a browser 712 and a MOSIM 714.

A user 720 accesses the ISP 700 by executing a web browser of an Internet site, which the user wants to access, through the browser 712 in step 730. As soon as the user 720 accesses the ISP 700, the user 720 inputs "MOSIM Enabled=ON" information, "USE_SIGCODE=YES" information, and "SignatureCode=NO" information in step 730. The "MOSIM Enabled=ON" information is information indicating that the mobile station 710 of the user has the MOSIM 714 and thus can perform authentication based on only its own information managed by the MOSIM 714, the "USE_SIGCODE=YES" information is information indicating that the mobile station 710 and the network generate and manage an authentication code shared by each other, and the "SignatureCode=NO" information is information indicating that the mobile station 710 does not have authentication information of the Internet site of the ISP 700. The "MOSIM Enabled=ON" information, the "USE_SIGCODE=YES" information, and the "SignatureCode=NO" information correspond to only examples, and it may be implemented in any other form.

Further, when there is a request for access information from the Internet site which the user wants to access, the user 720 selects a MOSIM mode for authenticating the user by using the MOSIM 714 and inputs identification information (e.g., USI) to be used in user authentication through the MOSIM mode in step 732. In this event, the identifier may be URI, URL, XRI, or MSISDN.

The RP 702 of the ISP 700 approves the MOSIM mode and extracts a port number and a web access address (i.e., local IP address) of the MOSIM which are defined as fixed values in step 734. Further, the RP 702 of the ISP 700 transmits a web browser of the Internet site which the user 720 wants to access, identification information (e.g., USI) input by the user 720, and an authentication request through the MOSIM to the browser 712 of the mobile station 710 in step 736. The mobile station 710 transmits an HTTP Get Request message including the authentication request and the identification information (e.g., USI) input by the user 720 to the MOSIM 714 through the port number and the local IP address extracted in step 734 in step 738.

Then, the MOSIM 714 requests the user 720 to provide security identification information (e.g., an identifier and a password) for authentication in step 740, and the user 720 inputs the requested security identification information through the MOSIM 714 in step 742. In this event, in order to mitigate keyboard hacking by another application program, the MOSIM 714 may display a picturized signature to enable the user 720 to input security identification information for user authentication.

Upon receiving the input security identification information, the MOSIM 714 determines whether the security identification information is valid information to authenticate the user 720 having input the security identification information in step 744, and then transmits the authentication result together with the permanent authentication key, which has been already generated through inter-authentication between the mobile station 710 and the Internet site of the ISP 700, i.e., the permanent authentication key stored in step 670 of FIG. 6, to the browser 712 of the mobile station 710 in step 746.

The browser 712 of the mobile station 710 transfers a web browser of the Internet site which the user 720 wants to access, together with the permanent authentication key, to the RP 702 of the ISP 700 in step 748, and the RP 702 of the ISP 700 authorizes the authentication result and the permanent authentication key in step 750. Further, the RP 702 of the ISP 700 displays the authorized authentication result to provide the user 720 with a service according to authentication success or failure in step 752.

Now, FIGS. 8A to 9B will be referred to in order to describe a double check scheme which may additionally be used when an ISP requires a higher reliability for authentication of a mobile station or a mobile station requires a higher reliability for an ISP in authenticating the user by using an already generated permanent authentication key.

Figure 8A:
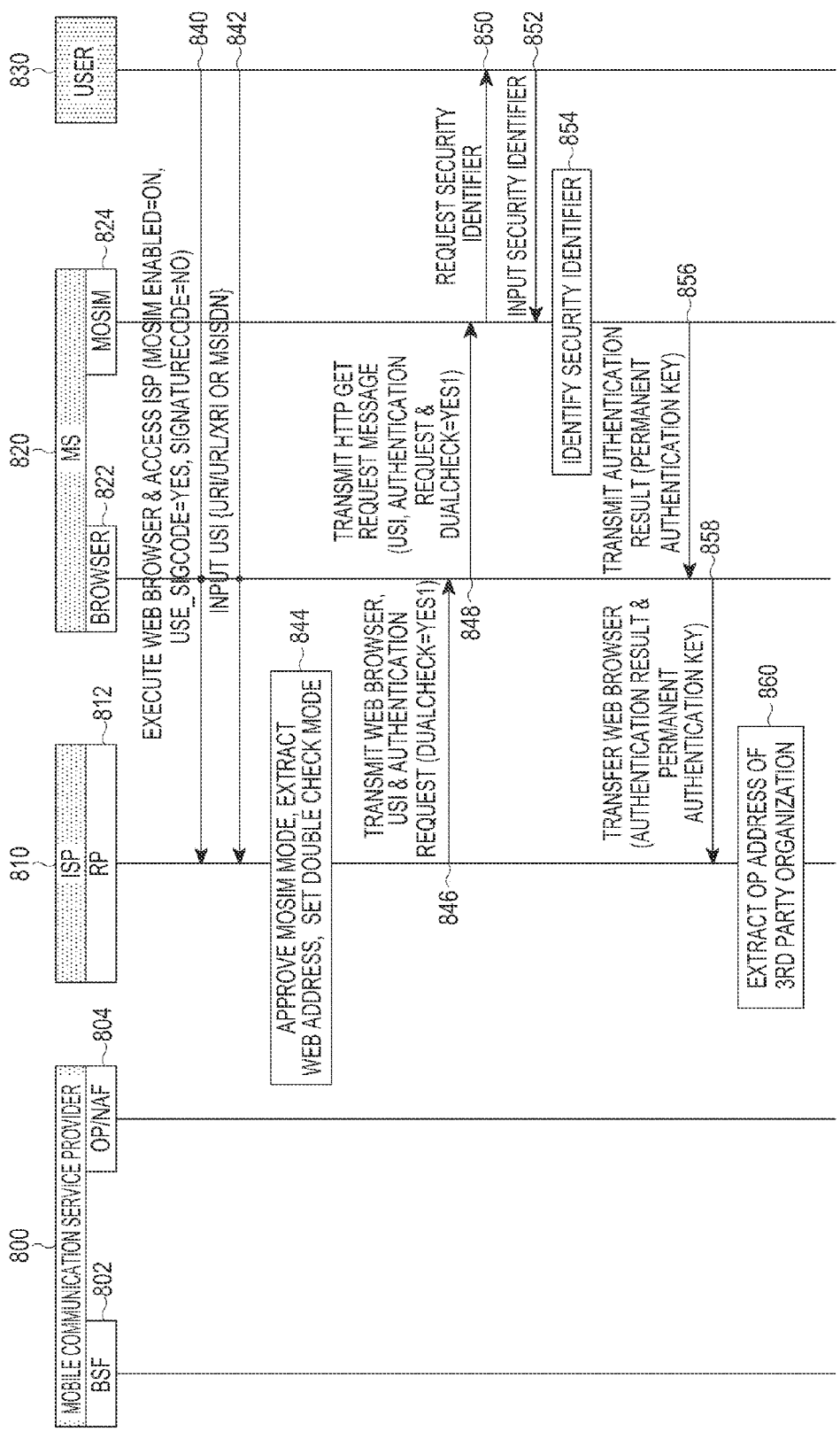
FIGS. 8A and 8B are signal flow diagrams illustrating a process of authenticating a user through double checking according to an Authentication and Key Agreement (AKA) authentication algorithm access scheme by a mobile station providing a MOSIM in a communication system according to an exemplary embodiment of the present invention.
Figure 8B:
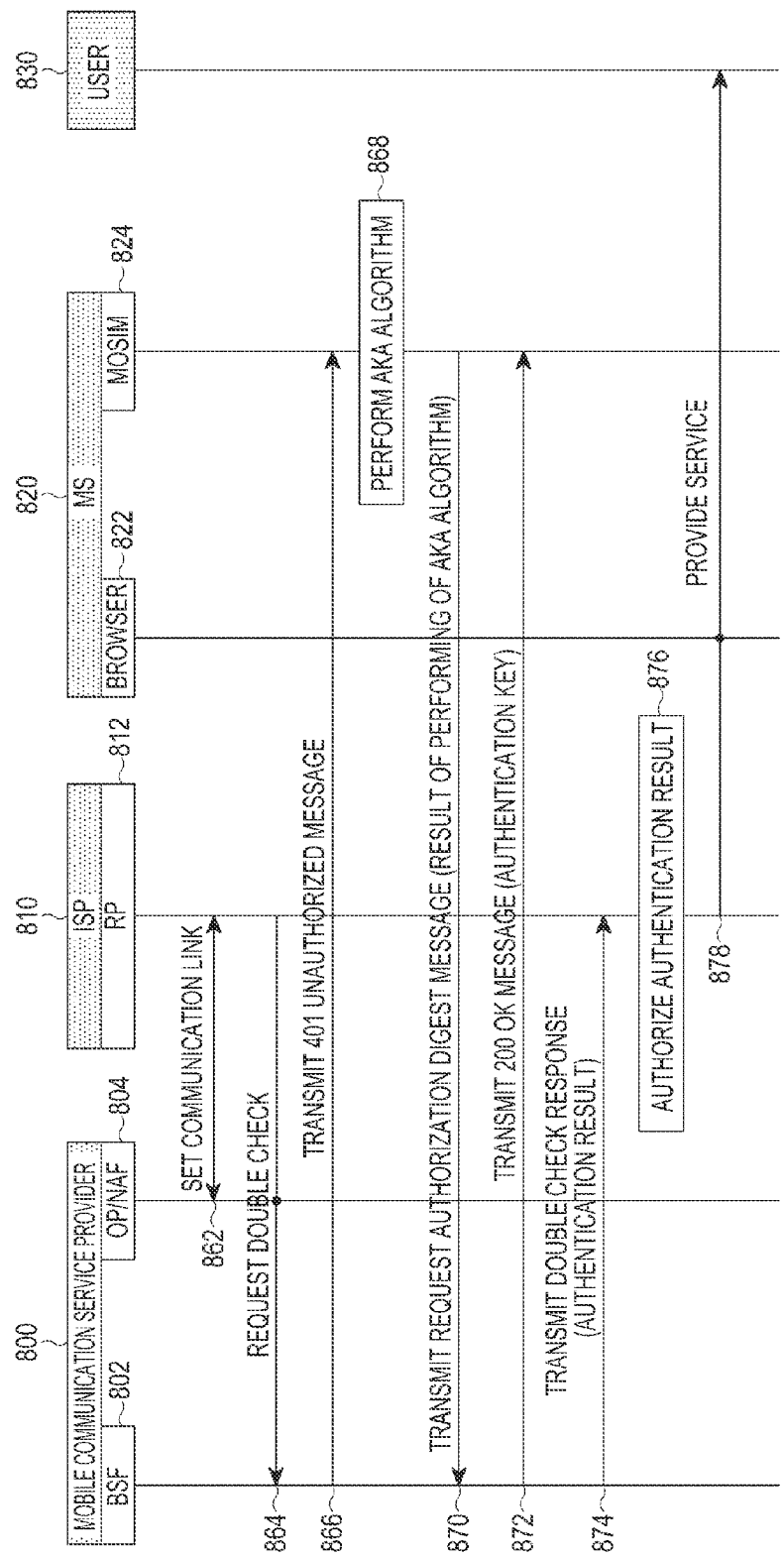

FIGS. 8A and 8B are signal flow diagrams illustrating a process of authenticating a user through double checking according to an AKA authentication algorithm access scheme by a mobile station providing a MOSIM in a communication system according to an exemplary embodiment of the present invention.

Referring to FIGS. 8A and 8B, a mobile communication service provider 800 manages a BSF unit 802 for authenticating a user 830, and an OP/NAF unit 804. An ISP 810 manages an RP 812 which performs user authentication, and a mobile station 820 manages a browser 822 and a MOSIM 824.

The user 830 accesses the ISP 810 by executing a web browser of an Internet site which the user wants to access through the browser 822 in step 840. In this event, as soon as the user 830 accesses the ISP 810, the user 830 inputs "MOSIM Enabled=ON" information, "USE_SIGCODE=YES" information, "SignatureCode=NO" information, and authentication information in step 842. The "MOSIM Enabled=ON" information is information indicating that the mobile station 820 of the user has a MOSIM and thus can perform authentication based on only its own information managed by the MOSIM 824, the "USE_SIGCODE=YES" information is information indicating that the mobile station 820 and the network generate and manage an authentication code shared by each other, and the "SignatureCode=NO" information is information indicating that the mobile station 820 does not have authentication information of the Internet site of the ISP 810. Further, it is assumed that the authentication information between the mobile station 820 and the ISP 810 is, for example, a permanent authentication key. The "MOSIM Enabled=ON" information, the "USE_SIGCODE=YES" information, and the "SignatureCode=NO" information correspond to only examples, and it may be implemented in any other form.

Further, when there is a request for access information from the Internet site which the user wants to access, the user 830 selects a MOSIM mode for authenticating the user by using the MOSIM, and inputs identification information, e.g., a USI, to be used in user authentication through the MOSIM mode in step 842. The identification information may include a URI, a URL, an XRI, or an MSISDN.

The RP 812 of the ISP 810 approves the MOSIM mode, extracts a port number and a web access address (i.e., local IP address) of the MOSIM which are defined as fixed values, and sets a double check mode applying the double check scheme in step 844. The double check mode may be defined as one of a plurality of modes according to the access scheme. Here, a first double check mode to which an AKA authentication algorithm is applied is described as an example.

Further, the RP 812 of the ISP 810 transmits the web browser of the Internet site which the user 830 wants to access, the USI input by the user 830, an authentication request through the MOSIM, and "DualCheck=YES1" information indicating that the first double check mode has been set to the browser 822 of the mobile station 820 in step 846, and the browser 822 of the mobile station 820 transmits an HTTP Get Request message including the identification information (e.g., USI) input by the user 830 and the authentication request the MOSIM 824 through the local IP address and port number extracted in step 844 in step 848.

Then, the MOSIM 824 requests the user 830 to provide security identification information (e.g., an identifier and a password) for authentication in step 850, and the user 830 inputs the requested security identification information through the MOSIM 824 in step 852. In this event, in order to mitigate keyboard hacking by another application program, the MOSIM 824 may display a picturized signature to enable the user 830 to input security identification information for user authentication.

Upon receiving the input security identification information, the MOSIM 824 determines whether the security identification information is valid information to authenticate the user 830 having input the security identification information in step 854, and then transmits the authentication result together with the permanent authentication key, which has been already generated through inter-authentication between the mobile station 820 and the Internet site of the ISP 810, i.e., the permanent authentication key stored in step 670 of FIG. 6, to the browser 822 of the mobile station 820 in step 856.

The browser 822 of the mobile station 820 transfers a web browser of the Internet site which the user 830 wants to access, together with the authentication result and the permanent authentication key, to the RP 812 of the ISP 810 in step 858, and the RP 812 of the ISP 810 extracts an OP address of a third party organization, which performs the user authentication by proxy, from the identification information (e.g., USI) input by the user 830 in step 860, and sets a security providing communication link with the third party organization, i.e., the mobile communication service provider 800 in step 862. In order to set the communication link, the DH key exchange scheme may be used, although it is optional to use this scheme.

Thereafter, the RP 812 of the ISP 810 transmits a double check request, which requests execution of double check by applying an AKA authentication algorithm access scheme, to the BSF unit 802 of the mobile communication service provider 800 in step 864, and the BSF unit 802 transmits a 401 Unauthorized message, which requests an AKA, to the MOSIM 824 of the mobile station 820 in step 866.

According to the request, the MOSIM 824 of the mobile station 820 performs an AKA algorithm in step 868 and transmits a Request Authorization Digest message including a result of execution of the AKA algorithm to the BSF unit 802 of the mobile communication service provider 800 in step 870.

The BSF unit 802 of the mobile communication service provider 800 determines the suitability of the mobile station based on the result of execution of the AKA algorithm received from the mobile station 820 and transmits a 200 OK message including the authentication key according to a result of the determination to the MOSIM 824 of the mobile station 820 in step 872. The 200 OK message includes lifetime information for valid use of the authentication key in future processes.

The OP/NAF unit 804 transmits a double check response including a result of execution of the double check as a response to the double check request received in step 864 to the RP 812 of the ISP 810 in step 874. The double check response includes, for example, an authentication result.

The RP 812 of the ISP 810 authorizes the authentication result in step 876, and displays the authorized authentication result to provide the user 830 with a service according to authentication success or failure in step 878.

The exemplary embodiment shown in FIGS. 8A and 8B reduces the 13 wireless link message transmissions or receptions in the case of FIGS. 1A and 1B to 8 wireless link message transmissions or receptions. Although the number of wireless link message transmissions or receptions is larger than that in the cases shown in FIGS. 5 to 7, the authentication is performed through the mobile station in FIGS. 8A and 8B remarkably improves the reliability of authentication.

Figure 9A:
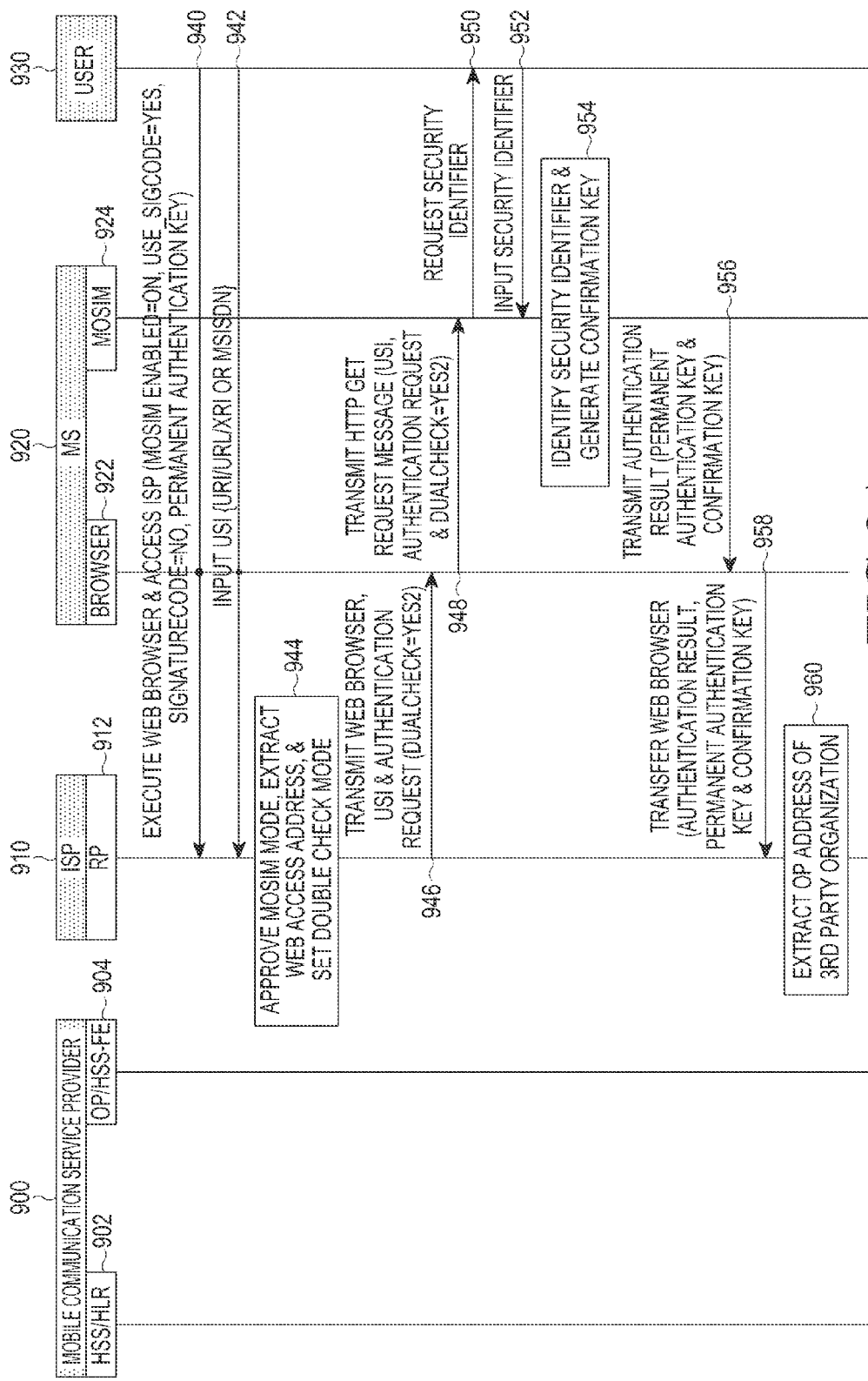
FIGS. 9A and 9B are signal flow diagrams illustrating a process of authenticating a user through a double check scheme according to an access scheme reducing a load of a wireless link by a mobile station providing a MOSIM in a communication system according to an exemplary embodiment of the present invention.
Figure 9B:
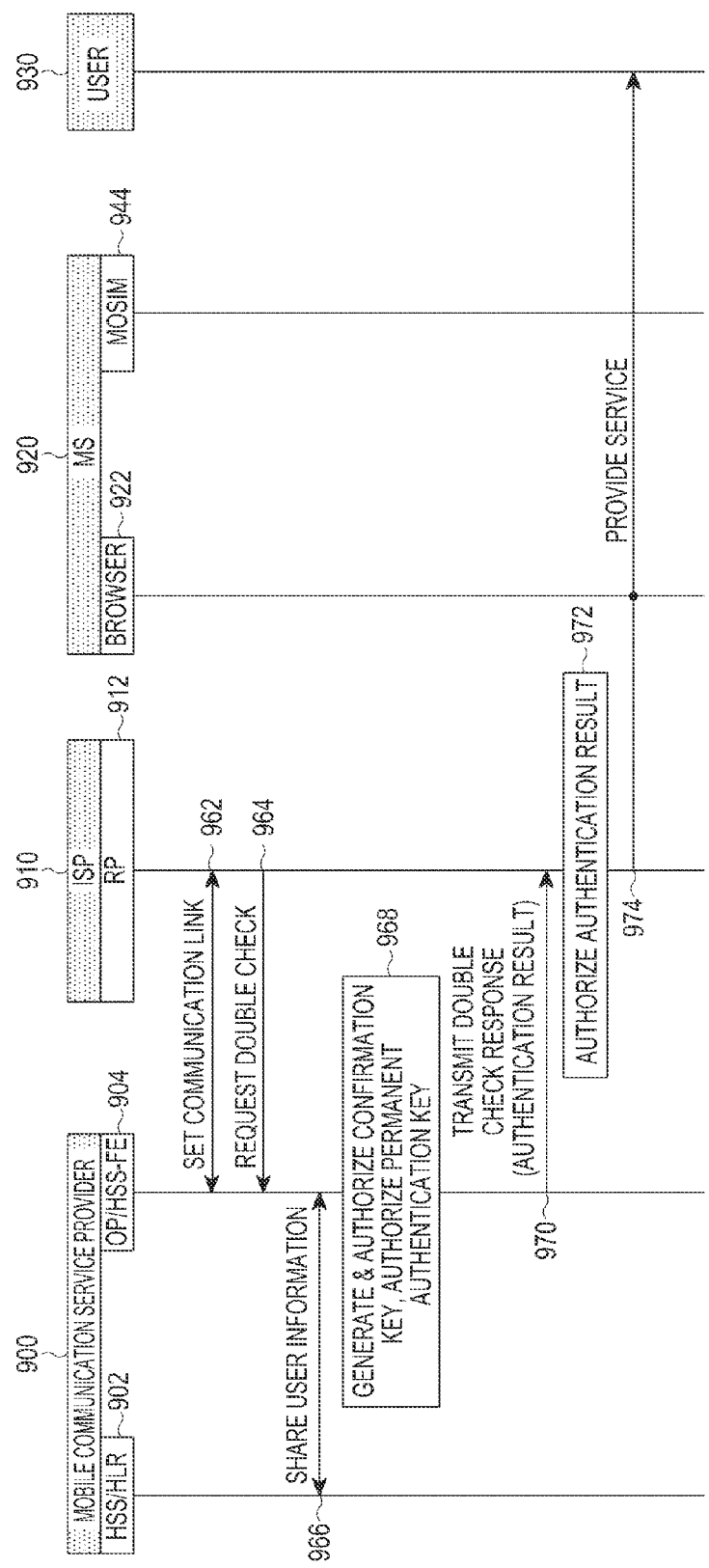

FIGS. 9A and 9B are signal flow diagrams illustrating a process of authenticating a user through a double check scheme according to an access scheme reducing a load of a wireless link by a mobile station providing a MOSIM in a communication system according to an exemplary embodiment of the present invention.

Referring to FIGS. 9A and 9B, a mobile communication service provider 900 manages an HSS/HLR 902 and an OP/HSS-FE 904. An ISP 910 manages an RP 912 which performs user authentication, and a mobile station 920 manages a browser 922 and a MOSIM 924.

The user 930 accesses the ISP 910 by executing a web browser of an Internet site which the user wants to access through the browser 922 in step 940. In this event, as soon as the user 930 accesses the ISP 910, the user 930 inputs "MOSIM Enabled=ON" information, "USE_SIGCODE=YES" information, "SignatureCode=NO" information, and authentication information in step 940. The "MOSIM Enabled=ON" information is information indicating that the mobile station 920 of the user has a MOSIM 924 and thus can perform authentication based on only its own information managed by the MOSIM 924, the "USE_SIGCODE=YES" information is information indicating that the mobile station 920 and the network generate and manage an authentication code shared by each other, and the "SignatureCode=NO" information is information indicating that the mobile station 920 does not have authentication information of the Internet site of the ISP 910.

Further, it is assumed that the authentication information between the mobile station 920 and the ISP 910 is, for example, a permanent authentication key. The "MOSIM Enabled=ON" information, the "USE_SIGCODE=YES" information, and the "SignatureCode=NO" information correspond to only examples, and it may be implemented in any other form.

Further, when there is a request for access information from the Internet site which the user wants to access, the user 930 selects a MOSIM mode for authenticating the user by using the MOSIM 924, and inputs identification information, e.g., a USI, to be used in user authentication through the MOSIM mode in step 942. The identification information may include a URI, a URL, an XRI, or an MSISDN.

The RP 912 of the ISP 910 approves the MOSIM mode, extracts a port number and a web access address (i.e., local IP address) of the MOSIM which are defined as fixed values, and sets a double check mode applying the double check scheme in step 944. The double check mode may be defined as one of a plurality of modes according to the access scheme. Here, a second double check mode to which an access scheme for reducing the load of a wireless interval is applied is described as an example.

Further, the RP 912 of the ISP 910 transmits the web browser of the Internet site which the user 930 wants to access, the identification information (e.g., USI) input by the user 930, an authentication request through the MOSIM, and "DualCheck=YES2" information indicating that the second double check mode has been set to the browser 922 of the mobile station 920 in step 946, and the browser 922 of the mobile station 920 transmits an HTTP Get Request message including the identification information (e.g., USI) input by the user 930 and the authentication request the MOSIM 924 through the local IP address and port number extracted in step 944 in step 948.

Then, the MOSIM 924 requests the user 930 to provide security identification information (e.g., an identifier and a password) for authentication in step 950, and the user 930 inputs the requested security identification information through the MOSIM 924 in step 952. In this event, in order to mitigate keyboard hacking by another application program, the MOSIM 924 may display a picturized signature to enable the user 930 to input security identification information for user authentication.

Upon receiving the input security identification information, the MOSIM 924 determines whether the security identification information is valid information to authenticate the user 930 having input the security identification information in step 954. Then, the MOSIM 924 transmits the authentication result together with the permanent authentication key, which has been already generated through inter-authentication between the mobile station 920 and the Internet site of the ISP 910, i.e., the permanent authentication key stored in step 670 of FIG. 6, to the browser 922 of the mobile station 920 in step 956. The browser 922 of the mobile station 920 transfers a web browser of the Internet site which the user 930 wants to access, together with the authentication result and the permanent authentication key, to the RP 912 of the ISP 910 in step 958.

Meanwhile, in step 954 described above, the MOSIM 924 may optionally generate a confirmation key, which corresponds to an authentication result value, by using an authentication time according to the current time value and user information, and the generated confirmation key information (i.e., a code indicating the confirmation key) and the authentication time value may be transferred to the RP 912 of the ISP 910 through the browser 922.

The RP 912 of the ISP 910 extracts an OP address of a third party organization, which performs the user authentication by proxy, from the identification information (e.g., USI) input by the user 930 in step 960, and sets a security providing communication link with the third party organization, i.e., the mobile communication service provider 900 in step 962. In order to set the communication link, the DH key exchange scheme may be used, although it is optional to use this scheme.

Thereafter, the RP 912 of the ISP 910 transmits a double check request, which requests a mobile station to perform a double check by applying an access scheme reducing the load of a wireless interval, to the OP/HSS-FE 904 of the mobile communication service provider 900 in step 964, wherein the double check request includes the confirmation key information and the permanent authentication key and the confirmation key information may not be included in a confirmation request.

The HSS/HLR 902 of the video encoding apparatus 900 shares user information with the OP/HSS-FE 904 in step 966. The OP/HSS-FE 904 authorizes the permanent authentication key, generates a confirmation key as an authentication result value by using the user information and the authentication time value, and compares the generated confirmation key with the confirmation key received in steps in 956 and 960 in step 968. Further, the OP/HSS-FE 904 transmits a double check response indicating a response to the double check request received in step 964 to the RP 912 of the ISP 910 in step 970. The confirmation result includes, for example, an authentication result.

The RP 912 of the ISP 910 authorizes the authentication result in step 972, and displays the authorized authentication result to provide the user 930 with a service according to authentication success or failure in step 974.

Hereinafter, FIGS. 10 and 11 will be referred to in order to describe a scheme in which a manager managing a company mobile station or a mobile communication service provider determines whether to allow a corresponding mobile station to access an Internet site, in consideration of a black list or a white list. Here, the black list refers to a list of Internet sites which the corresponding mobile station is not allowed to access and the white list refers to a list of Internet sites which the corresponding mobile station is allowed to access.

Figure 10:
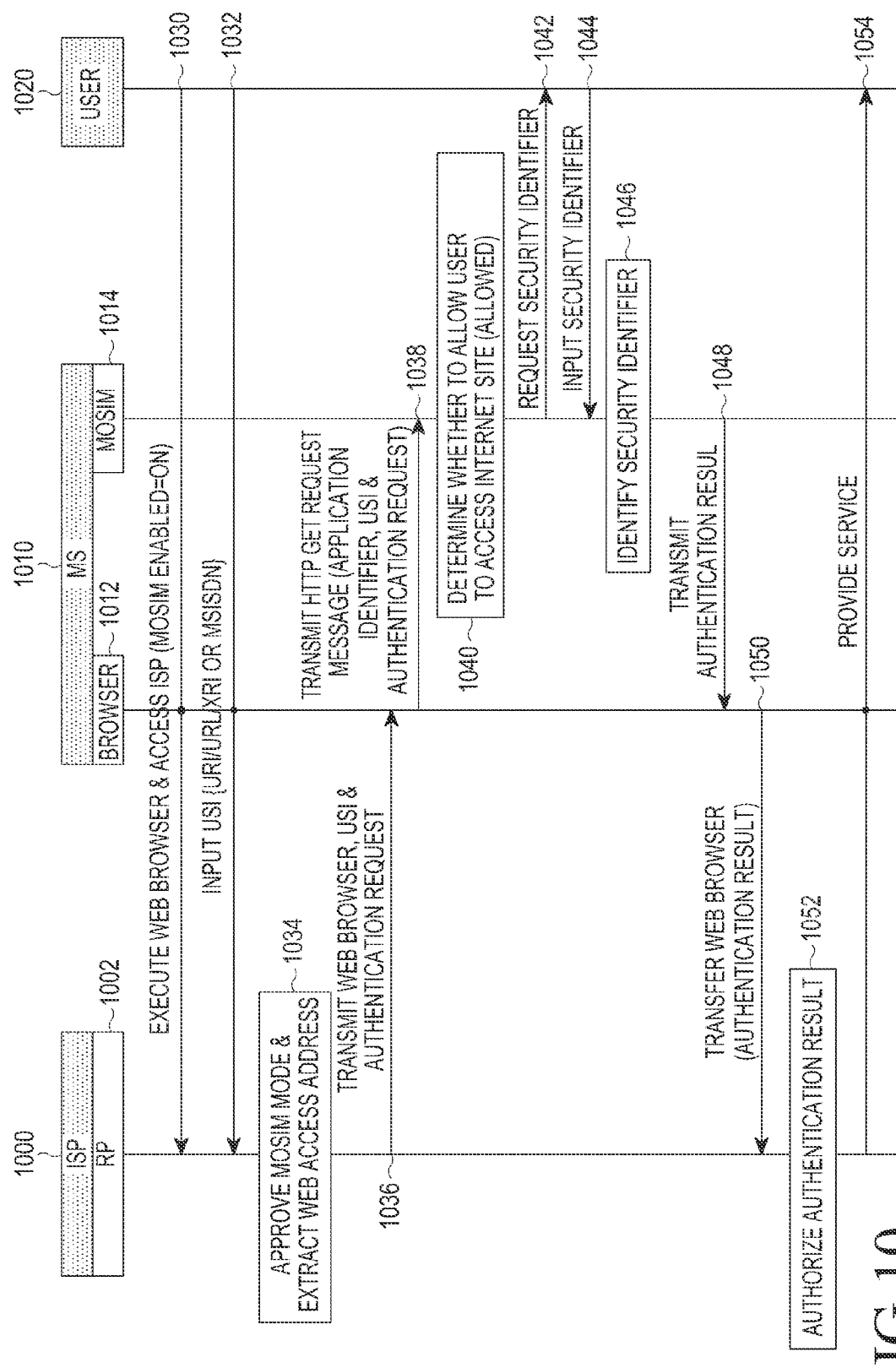
FIG. 10 is a signal flow diagram illustrating a process of allowing user access based on authorized application database information by a mobile station providing a MOSIM in a communication system according to an exemplary embodiment of the present invention.

FIG. 10 is a signal flow diagram illustrating a process of allowing user access based on authorized application database information by a mobile station providing a MOSIM in a communication system according to an exemplary embodiment of the present invention.

Referring to FIG. 10, an ISP 1000 manages an RP 1002 performing user authentication and a mobile station 1010 manages a browser 1012 and a MOSIM 1014.

A user 1020 accesses the ISP 1000 by executing a web browser of an Internet site, which the user wants to access, through the browser 1012 in step 1030. As soon as the user 1020 accesses the ISP 1000, the user 1020 inputs "MOSIM Enabled=ON" information indicating that the mobile station 1010 of the user has the MOSIM 1014 and thus can perform authentication based on only its own information managed by the MOSIM 1014 in step 1030. The "MOSIM Enabled=ON" information corresponds to only an example, and it may be implemented in any other form.

Further, when there is a request for access information from the Internet site which the user wants to access, the user 1020 selects a MOSIM mode for authenticating the user by using the MOSIM 1014 and inputs identification information (e.g., USI) to be used in user authentication through the MOSIM mode in step 1032. In this event, the identifier may be URI, URL, XRI, or MSISDN.

The RP 1002 of the ISP 1000 approves the MOSIM mode and extracts a port number and a web access address (i.e., local IP address) of the MOSIM which are defined as fixed values in step 1034. Further, the RP 1002 of the ISP 1000 transmits a web browser of the Internet site which the user 1020 wants to access, identification information (e.g., USI) input by the user 1020, and an authentication request through the MOSIM to the browser 1012 of the mobile station 1010 in step 1036. The mobile station 1010 transmits an HTTP Get Request message including an application identifier, the identification information (e.g., USI) input by the user 1020, and the authentication request to the MOSIM 1014 through the port number and the local IP address extracted in step 1034 in step 1038. Here, the application identifier may indicate the Internet site itself provided by the browser 1012 or a combination of information of a creator of a corresponding program and identification information of the corresponding program. Here, it is assumed that the application identifier indicates the Internet site.

The MOSIM 1014 of the mobile station 1010 determines whether to allow the user 1020 to access the Internet site, in consideration of a black list and a white list managed by an authorized application database in step 1040. Here, it is assumed that the MOSIM 1014 allows the access to the Internet site. For example, the MOSIM 1014 of the mobile station 1010 checks a black list and a white list managed by an authorized application database. Then, when the Internet site indicated by the application identifier is included in the white list, the MOSIM 1014 requests the user 1020 to provide security identification information (e.g., an identifier and a password) for authentication in step 1042, and the user 1020 inputs the requested security identification information through the MOSIM 1014 in step 1044. In this event, in order to mitigate keyboard hacking by another application program, the MOSIM 1014 may display a picturized signature to enable the user 1020 to input security identification information for user authentication.

Upon receiving the input security identification information, the MOSIM 1014 determines whether the security identification information is valid information to authenticate the user 1020 having input the security identification information in step 1046, and then transmits the authentication result to the browser 1012 of the mobile station 1010 in step 1048. The browser 1012 of the mobile station 1010 transfers a web browser of the Internet site which the user 1020 wants to access, together with the authentication result, to the RP 1002 of the ISP 1000 in step 1050.

The RP 1002 of the ISP 1000 authorizes the authentication result in step 1052, and displays the authorized authentication result to provide the user 1020 with a service according to authentication success or failure in step 1054.

Figure 11:
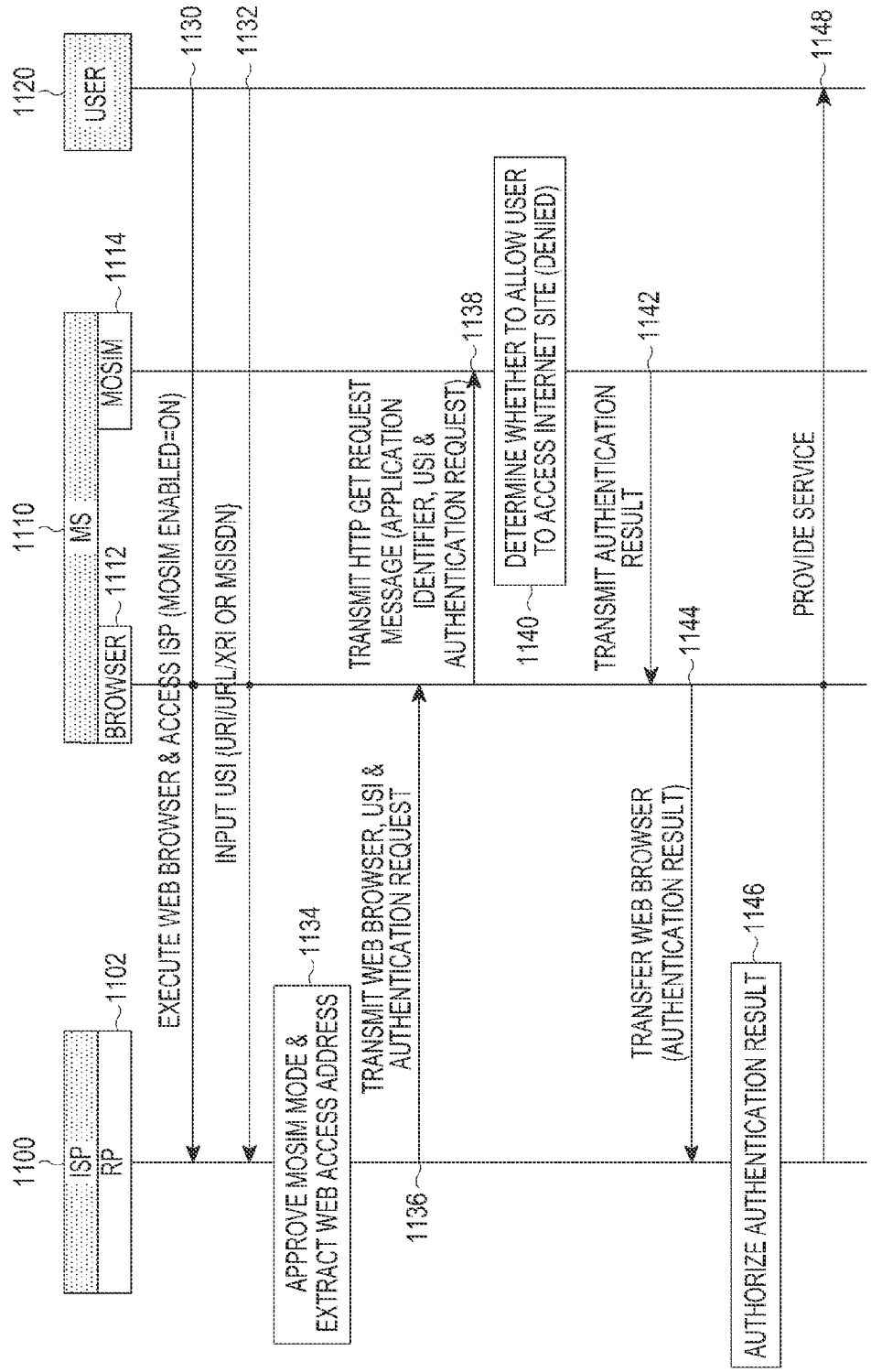
FIG. 11 is a signal flow diagram illustrating a process of denying user access based on authorized application database information by a mobile station providing a MOSIM in a communication system according to an exemplary embodiment of the present invention.

FIG. 11 is a signal flow diagram illustrating a process of denying user access based on authorized application database information by a mobile station providing a MOSIM in a communication system according to an exemplary embodiment of the present invention.

Referring to FIG. 11, an ISP 1100 manages an RP 1102 performing user authentication and a mobile station 1110 manages a browser 1112 and a MOSIM 1114.

A user 1120 accesses the ISP 1100 by executing a web browser of an Internet site, which the user wants to access, through the browser 1112 in step 1130. As soon as the user 1120 accesses the ISP 1100, the user 1120 inputs "MOSIM Enabled=ON" information indicating that the mobile station 1110 of the user has the MOSIM 1114 and thus can perform authentication based on only its own information managed by the MOSIM 1114 in step 1130. The "MOSIM Enabled=ON" information corresponds to only an example, and it may be implemented in any other form.

Further, when there is a request for access information from the Internet site which the user wants to access, the user 1120 selects a MOSIM mode for authenticating the user by using the MOSIM 1114 and inputs identification information (e.g., USI) to be used in user authentication through the MOSIM mode in step 1132. In this event, the identifier may be URI, URL, XRI, or MSISDN.

The RP 1102 of the ISP 1100 approves the MOSIM mode and extracts a port number and a web access address (i.e., local IP address) of the MOSIM which are defined as fixed values in step 1134. Further, the RP 1102 of the ISP 1100 transmits a web browser of the Internet site which the user 1120 wants to access, identification information (e.g., USI) input by the user 1120, and an authentication request through the MOSIM to the browser 1112 of the mobile station 1110 in step 1136. The mobile station 1110 transmits an HTTP Get Request message including an application identifier, the identification information (e.g., USI) input by the user 1120, and the authentication request to the MOSIM 1114 through the port number and the local IP address extracted in step 1134 in step 1138. Here, the application identifier may indicate the Internet site itself provided by the browser 1112 or a combination of information of a creator of a corresponding program and identification information of the corresponding program. Here, it is assumed that the application identifier indicates the Internet site.

The MOSIM 1114 of the mobile station 1110 determines whether to allow the user 1120 to access the Internet site, in consideration of a black list and a white list managed by an authorized application database in step 1140. Here, it is assumed that the MOSIM 1114 denies the access to the Internet site. For example, the MOSIM 1114 of the mobile station 1110 checks a black list and a white list managed by an authorized application database. Then, when the Internet site indicated by the application identifier is included in the black list, the MOSIM 1114 transmits an authentication result indicating that the access to the Internet site has been denied to the browser 1112 in step 1142.

The browser 1112 of the mobile station 1110 transfers a web browser of the Internet site which the user 1120 wants to access, together with the authentication result, to the RP 1102 of the ISP 1100 in step 1144.

The RP 1102 of the ISP 1100 authorizes the authentication result in step 1146, and displays the authorized authentication result to provide the user 1120 with a service according to authentication success or failure in step 1148.

Although not shown in the drawings, the black list and the white list used in the process of allowing or denying the user access as described in FIGS. 10 and 11 may be managed by setting a separate security-guaranteeing communication link between the MOSIM of the mobile station and a module managing the mobile station among modules managed by a mobile communication service provider. For example, the black list and the white list can be managed by updating the list of corresponding Internet sites through the set communication link.

For example, the module managing the mobile station transfers information of the Internet sites to be included in the black list and the white list to the MOSIM of the mobile station, and the MOSIM of the mobile station transfers statistic information, which is obtained in the case of having actually accessed an Internet site and performed a communication, to the module managing the mobile station. Further, when transmission and reception of the information of the Internet sites have been completed, the separate communication link described above is cancelled.

The exemplary embodiments of the present invention can reduce an amount of time for an authentication process and the traffic load in a wireless communication link in comparison with the related-art user authentication scheme.

First, when a related-art Open ID service is applied to a mobile communication network and a mobile communication service provider thus functions as an agency for authentication of an Internet service, the authentication uses 13 wireless link message transmissions or receptions in the related-art scheme. However, the schemes of the exemplary embodiments of the present invention can complete the authentication through about five wireless link message transmissions or receptions in the least, so as to enable the operation without separate charging on the authentication traffic from the user or the Internet service provider.

Second, in a wireless link which is relatively slower than a wired link, the exemplary embodiments of the present invention can support reduced message transmission or reception, so as to reduce authentication delay time according to transmission or reception of authentication messages. Therefore, the exemplary embodiments of the present invention support a scheme capable of minimizing the inconvenience of the user even when authentication through a third party authentication organization is actively used in a wireless environment.

Third, the exemplary embodiments of the present invention can reduce the load of authentication-related apparatuses, which may be generated when a mobile communication service provider performs authentication for another Internet service other than the mobile communication service provider's own service. Also, in comparison with the related-art schemes, the schemes proposed by the exemplary embodiments of the present invention can reduce the number or time by or during which apparatuses of a mobile communication network participate in the authentication. As a result, the exemplary embodiments of the present invention can reduce the load on the existing network even when a mobile communication service provider performs an authentication, such as an Open ID service, by proxy.

Fourth, the exemplary embodiments of the present invention can provide a differentiated authentication level by improving the reliability desired by the Internet service provider. For example, based on an assumption of a completely reliable MOSIM, the exemplary embodiments of the present invention propose various schemes, which include a scheme capable of improving the reliability of the authentication by using an authentication key value previously authenticated by an Internet service provider and a MOSIM, a scheme supporting multiple authentications including authentication of a mobile communication network in addition to the authentication based on a MOSIM of a mobile station through participation of a mobile communication network, and a scheme in which a mobile station manages a database for allowing or denying access to an Internet site, so as to satisfy requirements for various authentications.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method of performing user authentication of a mobile station by proxy in a communication system, the method comprising:
   receiving an authentication request including information of an Internet site, and user identification information to be used for authentication of the user from an internet service provider;
   determining whether to allow the user to access the Internet site, in consideration of database information managed by the mobile station;
   requesting security identification information for authentication of the user;
   receiving the security identification information;
   authenticating, by the mobile station, the user by determining whether the received security identification information comprises valid information, based on security-requiring information managed by the mobile station and the user identification information;
   transmitting an authentication result to the internet service provider;
   receiving an authorized authentication result from the internet service provider; and
   displaying the authorized authentication result to provide a service related to authentication success or failure.

2. The method of claim 1, wherein the mobile station manages a plurality of local internet protocol (IP) addresses/port numbers, and the authentication request is received through a local IP address/port number indicated by a web access address extracted by the internet service provider.

3. The method of claim 1, wherein the database information comprises a black list including information of Internet sites not allowed to be accessed and a white list including information of Internet sites allowed to be accessed, and the black list and the white list are updated through a communication link set between a mobile communication service provider and the mobile station.

4. A mobile station for performing authentication of a user by proxy in a communication system, the mobile station comprising:
   an integrated circuit; and
   a user interface configured to:
      request security identification information for authentication of a user, and
      receive the security identification information; and
   a security local web server configured to:
      receive an authentication request including information of an Internet site, and user identification information to be used for authentication of the user from an internet service provider,
      determine whether to allow the user to access the Internet site, in consideration of database information managed by the mobile station,
      authenticate the user by determining whether the received security identification information comprises valid information, based on security-requiring information managed by the mobile station and the user identification information,
      transmit an authentication result to the internet service provider,
      receive an authorized authentication result from the internet service provider, and
      display the authorized authentication result to provide a service related to authentication success or failure.

5. The mobile station of claim 4,
   wherein the security local web server is further configured to manage a plurality of local internet protocol (IP) addresses/port numbers, and
   wherein the authentication request is received through a local IP address/port number indicated by a web access address extracted by the internet service provider.

6. The mobile station of claim 4, wherein the database information comprises a black list including information of Internet sites not allowed to be accessed and a white list including information of Internet sites allowed to be accessed, the black list and the white list being updated through a communication link set between a mobile communication service provider and the mobile station.

7. The method of claim 1, wherein the security-requiring information includes at least one of authorized application database information, subscriber information, internet protocol multimedia subsystem (IMS) authentication information, secured signature, and database information.

8. The mobile station of claim 4, wherein the security-requiring information includes at least one of authorized application database information, subscriber information, internet protocol multimedia subsystem (IMS) authentication information, secured signature, and database information.

* * * * *